United States Patent
Morii

(10) Patent No.: US 6,205,421 B1
(45) Date of Patent: Mar. 20, 2001

(54) SPEECH CODING APPARATUS, LINEAR PREDICTION COEFFICIENT ANALYZING APPARATUS AND NOISE REDUCING APPARATUS

(75) Inventor: Toshiyuki Morii, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/475,249

(22) Filed: Dec. 30, 1999

Related U.S. Application Data

(62) Division of application No. 09/059,568, filed on Apr. 14, 1998, now Pat. No. 6,067,518, which is a division of application No. 08/559,667, filed on Nov. 20, 1995.

(30) Foreign Application Priority Data

| Dec. 19, 1994 | (JP) | 6-314463 |
| Dec. 26, 1994 | (JP) | 6-322495 |
| Dec. 26, 1994 | (JP) | 6-332494 |
| Jul. 14, 1995 | (JP) | 7-178484 |

(51) Int. Cl.$^7$ .................................................. G10L 21/02
(52) U.S. Cl. ........................ 704/226; 704/227; 704/228; 704/229
(58) Field of Search .................................. 704/226, 227, 704/228, 229

(56) References Cited

U.S. PATENT DOCUMENTS

| 4,720,861 | 1/1988 | Bertrand | 395/2.41 |
| 4,972,484 | * 11/1990 | Thiele et al. | 704/228 |
| 5,012,519 | 4/1991 | Adlersburg et al. | 381/47 |
| 5,091,945 | 2/1992 | Kleijn | 704/262 |

(List continued on next page.)

FOREIGN PATENT DOCUMENTS

| 0573398 | 12/1993 | (EP) . |
| 0578436 | 1/1994 | (EP) . |
| 0594480 | 4/1994 | (EP) . |
| 0631274 | 12/1994 | (EP) . |
| 6348293 | 12/1994 | (JP) . |
| 9206470 | 4/1992 | (WO) . |

OTHER PUBLICATIONS

McElroy et al., ("Wideband Speech Coding using multiple codebooks and glottal pulses", ICASSP–95, May 1995, vol. 1, pp. 253–256).

(List continued on next page.)

*Primary Examiner*—David R. Hudspeth
*Assistant Examiner*—Vijay Chawan
(74) *Attorney, Agent, or Firm*—Lowe Hauptman Gopstein Gilman & Berner, LLP

(57) ABSTRACT

A sample speech is analyzed by a speech analyzing unit to obtain sample characteristic parameters, and a coding distortion is calculated from the sample characteristic parameters in each of a plurality of coding modules. The sample characteristic parameters and the coding distortions are statistically processed by a statistical processing unit to obtain a coding module selecting rule. Thereafter, when a speech is analyzed by the speech analyzing unit to obtain characteristic parameters, an appropriate coding module is selected by a coding module selecting unit from the coding modules according to the coding module selecting rule on condition that a coding distortion for the characteristic parameters is minimized in the appropriate coding module. Thereafter, the characteristic parameters of the speech are coded in the appropriate coding module, and a coded speech is obtained. When the coded speech is decoded, a reproduced speech is obtained. Accordingly, because an appropriate coding module can be easily selected from a plurality of coding modules according to the coding module selecting rule, any allophone occurring in a reproduced speech can be prevented at a low calculation volume.

15 Claims, 9 Drawing Sheets

U.S. PATENT DOCUMENTS

| | | |
|---|---|---|
| 5,133,013 | 7/1992 | Munday .................................. 381/47 |
| 5,185,800 | 2/1993 | Mahieux ............................... 395/2.4 |
| 5,255,342 | 10/1993 | Nitta ........................................ 395/2 |
| 5,285,522 | 2/1994 | Mueller ............................... 395/2.41 |
| 5,381,513 | 1/1995 | Tsuboka .............................. 395/2.41 |
| 5,404,422 | 4/1995 | Sakamoto et al. .................. 395/2.41 |
| 5,457,768 | 10/1995 | Tsuboi et al. ........................ 395/2.41 |
| 5,479,563 | 12/1995 | Yamaguchi .......................... 395/2.41 |
| 5,528,728 | 6/1996 | Matsuura et al. ................... 395/2.41 |
| 5,566,270 | 10/1996 | Albesano et al. ................... 395/2.41 |
| 5,598,505 * | 1/1997 | Austin et al. ........................ 704/226 |
| 5,706,395 * | 1/1998 | Arslan et al. ........................ 704/226 |
| 5,717,823 | 2/1998 | Kleijn .............................. 704/220.45 |
| 5,752,223 | 5/1998 | Aoyagi et al. ................. 704/219.07 |
| 5,774,835 * | 6/1998 | Ozawa ................................. 704/205 |
| 5,774,837 * | 6/1998 | Yeldener et al. .................... 704/208 |
| 5,774,846 | 6/1998 | Morii .............................. 704/232.07 |

OTHER PUBLICATIONS

Woodard et al. ("Improvements to the Analysis–by–Synthesis loop in CELPcodecs", Sixth International Conference on Radio receivers and Associated Systems, Sep. 1995, pp. 114–115).

Zhang et al., ("A CELP variable rate speech codec with low average rate", ICASSP–97, Apr. 1997, vol. 2, pp. 735–738).

Boll, S.F.: "Supperssicon of Acoustic Noise in Speech Using Spectral Subtraction", IEEE Transactions on Acoustics, Speech and Signal Processing, vol. 27, No. 2, Apr. 1, 1979, pp. 113–120, XP000560457.

"2–Q–23 Variable Bit–rate Speech Coding Based on PSI–CELP" by H. Ohmuro et al.; Japanese Acoustic Society Papers; pp. 309–120 (w/partial English translation).

The Autocorrelation Method by L.R. Labiner et al; Digital Processing of Speech Signals; pp. 401–403.

"Code–Excited Linear Prediction (CELP): High–Quality Speech at Very Low Bit Rates" by M.R. Schroeder et al; 1985 IEEE; pp. 937–940.

"An Algorithm for Vector Quantizer Design" by Y. Linde et al; IEEE Transactions on Communications, vol. COM–28, No. 1, Jan., 1980; pp. 84–94.

Easton M.G. et al: "A CELP Codebook and Search Technique Using a Hopfield Net", Speech Processing 1, Toronto; May 14–17, 1991; vol. 1, May 14, 1991, Institute of Electrical and Electronics Engineers, pp. 658–188 vol. 2 or 5, Apr. 27, 1993.

Institute of Electrical and Electronics Engineers, pp. 685–188, XP000245321.

Hernandez–Gomez, L.A. et al.: "Phnoetically–Driven CELP Coding Using Self–Organizing Maps", Speech Processing, Minneapolis, Apr. 27–30, 1993; vol. 2 or 5, Apr. 27, 1993, Institute of Electrical and Electronics Engineers, pp. II–628–II–631, XP000427868.

Indrayanto A. et al., "A Neural Network Mapper for Stochastic Code Book Parameter Encoding in Code–Excited Linear Predictive Speech Processing", Processing of the Western Canada Conference on Computer, Power and Communications Systems in a Rural Environment. (WESCANEX), Pegina, May 29–30, 1991.

* cited by examiner

FIG. 7

| NO. OF THE ANALYZING PERIODS | VOICE POWER | AUTO-CORRELATION COEFFICIENTS | | VOICE POWER RATIO | LONG-TERM PREDICTION COEFFICIENTS | PULSE VALUE | NORMALIZATION POWER | CANDIDATE FOR PITCH | CORDING DISTORTION INDICATED BY S/N RATIO | | | | | NO. OF APPROPRIATE CODING MODULE |
|---|---|---|---|---|---|---|---|---|---|---|---|---|---|---|
| | | PRIMARY | 2nd | | | | | | MODULE 1 | MODULE 2 | MODULE 3 | MODULE 4 | MODULE 5 | |
| 0 | 2.173 | 0.713 | 0.479 | 0.141 | 0.148 | 0.011 | 0.841 | 23 | 0.000 | 0.000 | 0.000 | 0.000 | 0.000 | 5 |
| 1 | 0.061 | 0.270 | 0.051 | 0.174 | 0.195 | 0.193 | 0.688 | 27 | 0.000 | 0.000 | 0.000 | 0.000 | 0.000 | 5 |
| 2 | 0.029 | -0.074 | -0.058 | 0.130 | 0.180 | 0.028 | 0.571 | 39 | 0.000 | 0.000 | 0.000 | 0.000 | 0.000 | 5 |
| 3 | 0.027 | -0.003 | -0.139 | 0.152 | 0.156 | 0.041 | 0.463 | 41 | 0.000 | 0.000 | 0.000 | 0.000 | 0.000 | 5 |
| 4 | 0.031 | -0.247 | -0.351 | 0.150 | 0.148 | 0.012 | 0.749 | 23 | 0.000 | 0.000 | 0.000 | 0.000 | 0.000 | 5 |
| 5 | 0.016 | -0.241 | 0.000 | 0.160 | 0.070 | 0.000 | 0.890 | 38 | 0.000 | 0.000 | 0.000 | 0.000 | 0.000 | 5 |
| 6 | 0.029 | 0.117 | -0.119 | 0.177 | 0.180 | 0.042 | 0.702 | 62 | 0.000 | 0.000 | 0.000 | 0.000 | 0.000 | 5 |
| 7 | 0.014 | 0.003 | -0.077 | 0.247 | 0.117 | 0.104 | 0.770 | 59 | 0.000 | 0.000 | 0.000 | 0.000 | 0.000 | 5 |
| 8 | 49016.524 | 0.478 | -0.426 | 0.151 | 0.188 | 0.111 | 0.788 | 16 | 3.495 | 4.520 | 0.526 | 1.721 | 0.883 | 2 |
| 9 | 67035.218 | 0.436 | -0.409 | 0.165 | 0.336 | 0.065 | 0.167 | 18 | 5.250 | 5.534 | 0.673 | 1.995 | 1.260 | 2 |
| 10 | 162991.576 | 0.451 | -0.383 | 0.256 | 0.305 | 0.014 | 0.289 | 24 | 4.881 | 5.259 | 1.359 | 2.521 | 0.826 | 2 |
| 11 | 893765.121 | 0.792 | 0.360 | 0.258 | 0.312 | 0.017 | 0.364 | 43 | 5.346 | 5.090 | 1.149 | 2.241 | 0.491 | 2 |
| 12 | 8988145.136 | 0.771 | 0.285 | 0.572 | 0.312 | 0.322 | 0.513 | 40 | 9.872 | 7.311 | 5.222 | 2.689 | 1.064 | 2 |
| 13 | 18178059.652 | 0.758 | 0.274 | 0.719 | 0.266 | 0.688 | 0.485 | 38 | 9.998 | 6.700 | 7.734 | 3.707 | 1.270 | 2 |
| 14 | 3185444.959 | 0.785 | 0.417 | 0.430 | 0.242 | 0.649 | 0.608 | 38 | 7.263 | 6.091 | 3.679 | 4.610 | 1.146 | 2 |
| 15 | 8174221.206 | 0.805 | 0.509 | 0.678 | 0.281 | 0.351 | 0.471 | 35 | 10.474 | 7.131 | 8.680 | 3.620 | 0.817 | 1 |
| 16 | 13366907.599 | 0.811 | 0.538 | 0.830 | 0.188 | 0.926 | 0.687 | 35 | 13.547 | 8.983 | 9.925 | 4.070 | 1.805 | 1 |
| 17 | 12520034.594 | 0.831 | 0.571 | 0.679 | 0.164 | 0.629 | 0.771 | 36 | 14.910 | 9.173 | 13.446 | 4.179 | 1.483 | 1 |
| 18 | 11098012.995 | 0.893 | 0.665 | 0.476 | 0.203 | 0.513 | 0.643 | 38 | 13.117 | 10.677 | 10.229 | 4.265 | 1.506 | 1 |
| 19 | 5502417.846 | 0.913 | 0.710 | 0.246 | 0.297 | 0.017 | 0.382 | 84 | 12.619 | 10.637 | 7.996 | 4.008 | 2.152 | 1 |
| 20 | 3131338.762 | 0.892 | 0.642 | 0.433 | 0.219 | 0.302 | 0.653 | 46 | 12.566 | 8.789 | 9.577 | 5.135 | 1.717 | 1 |
| 21 | 6968244.433 | 0.873 | 0.572 | 0.383 | 0.266 | 0.425 | 0.652 | 49 | 10.147 | 8.251 | 6.362 | 3.786 | 1.702 | 1 |
| 22 | 8643054.702 | 0.853 | 0.509 | 0.468 | 0.234 | 0.517 | 0.520 | 52 | 9.557 | 8.661 | 7.044 | 3.511 | 0.891 | 1 |

| CODING MODULE | M1 | M2 | M3 | M4 | M5 |
|---|---|---|---|---|---|
| BIT RATE | 8 kbps | | 4 kbps | | 2 kbps |
| LPC | 33 | | 12 | | 7 |
| VOICE POWER | 7 | | 7 | | 7 |
| SUB-FRAMES | 29×4 | 30×4 | 30×2 | 16×4 | 13×2 |
| ADAPTIVE CODING BOOK | 8 | | 9 | | |
| PROBABILISTIC CODING BOOK | 14 | 24 | 14 | 12 | 9 |
| GAIN | 7 | 6 | 7 | 4 | 4 |

| CODING MODULE TO BE SELECTED | CODING MODULE ACTUALLY SELECTED ||||| RECOGNIZING COEFFICIENT (%) |
| --- | --- | --- | --- | --- | --- | --- |
| | CODING MODULE M1 | CODING MODULE M2 | CODING MODULE M3 | CODING MODULE M4 | CODING MODULE M5 | |
| CODING MODULE M1 | 2337 | 143 | 157 | 0 | 0 | 88.6 |
| CODING MODULE M2 | 160 | 1436 | 1 | 90 | 2 | 85.0 |
| CODING MODULE M3 | 179 | 0 | 285 | 1 | 0 | 61.2 |
| CODING MODULE M4 | 0 | 35 | 0 | 464 | 5 | 92.0 |
| CODING MODULE M5 | 0 | 2 | 0 | 20 | 1959 | 98.8 |

UNIT : THE NUMBER OF SAMPLES

SPEECH CODING APPARATUS, LINEAR PREDICTION COEFFICIENT ANALYZING APPARATUS AND NOISE REDUCING APPARATUS

This application is a Divisional of application Ser. No. 09/059,568 filed Apr. 14, 1998 which is a divisional of Ser. No. 08/559,667 filed Nov. 20, 1995.

BACKGROUND OF THE INVENTION

1. Field of the Invention

The present invention relates to a speech coding apparatus in which pieces of speech information are coded to digital signals having a small information volume and the digital signals are transmitted and decoded to perform an efficient data transmission. Also, the present invention relates to a linear prediction coefficient analyzing apparatus in which a digital speech signal having an analyzing time-length is analyzed to obtain a linear prediction coefficient used in the speech coding apparatus. Also, the present invention relates to a noise reducing apparatus in which noise existing in speech information is reduced at a moderate degree before the speech information is coded in the speech coding apparatus.

2. Description of the Related Art

In a digital moving communication field such as a portable telephone, a compression coding method for speech signals transmitted at a low bit rate is required because subscribers in a digital moving communication have been increased, and research and development on the compression coding method have been carried out in various research facilities. In Japan, a coding method called a vector sum excited linear prediction (VSELP), proposed by the Motolora company, in which signals are transmitted at a bit rate of 11.2 kbits per second (kbps) is adopted as a standard coding method for a digital portable telephone. The digital portable telephone manufactured according to the VSELP coding method has been put on sale in Japan since the autumn of 1994. Also, another coding method called a pitch synchronous innovation code exited linear prediction (PSI-CELP), proposed by the NTT moving communication network Co., LTD., in which signals are transmitted at a bit rate of 5.6 kbps is adopted in Japan as a next standard coding method for a next portable telephone, and the development of the next portable telephone is going on now. These standard coding methods are obtained by improving a CELP which is disclosed by M. R. Schroeder in "High Quality Speech at Low Bit Rates" Proc. ICASSP, '85, pp.937–940. In this CELP coding method, speech information obtained from an input speech is separated into sound source information based on vibrational sounds of vocal cords and vocal tract information based on shapes of a vocal tract extending from the vocal cords to a mouth. The sound source information is coded according to a plurality of sound source samples stored in a code book while considering the vocal tract information and is compared with the input speech, and the vocal tract information is coded with a linear prediction coefficient. That is, an analysis by synthesis (A-b-S) method is adopted in the CELP coding method.

2.1. PREVIOUSLY PROPOSED ART

A fundamental algorithm of the CELP coding method is described.

FIG. 1 is a functional block diagram of a conventional speech coding apparatus according to the CELP coding method.

In FIG. 1, when a voice or speech is given to an input speech receiving unit 102 of a conventional speech coding apparatus 101 as pieces of speech data, an auto-correlation analysis and a linear prediction coefficient analysis for each of the speech data are performed in a linear prediction coefficient (LPC) analyzing unit 103 to obtain a linear prediction coefficient for each of the speech data. Thereafter, in the unit 103, each of the linear prediction coefficients is coded to obtain an LPC code, and the LPC code is decoded to obtain a reproduced linear prediction coefficient.

Thereafter, all of first sound source samples stored in an adaptive code book 104 and all of second sound source samples stored in a probabilistic code book 105 are taken out to an adding unit 106. In the adding unit 106, an optimum gain for each of the first and second sound source samples is calculated, the sound source samples are power-adjusted according to the optimum gains, and a plurality of synthesis sound sources are obtained as a result of all combinations of the power-adjusted first sound source samples and the power-adjusted second sound source samples. That is, each of the synthesis sound sources is obtained by adding one of the power-adjusted first sound source samples and one of the power-adjusted second sound source samples.

Thereafter, in an LPC synthesizing unit 107, the synthesis sound sources are filtered with the reproduced linear prediction coefficient obtained in the LPC analyzing unit 103 to obtain a plurality of synthesis speeches. Thereafter, in a comparing unit 108, a distance between each of the speech data received in the input speech receiving unit 102 and each of the synthesis speeches is calculated, a particular synthesis speech corresponding to a particular distance which is the minimum value among the distances is selected from the synthesis speeches, and a particular first sound source sample and a particular second sound source sample corresponding to the particular synthesis speech are obtained.

Thereafter, in a parameter coding unit 109, the optimum gains calculated in the adding unit 106 are coded to obtain a plurality of gain codes. The LPC code obtained in the LPC analyzing unit 103, index codes indicating the particular sound source samples obtained in the comparing unit 108 and the gain codes are transmitted to a transmission line 110 in a group. Also, a synthesis sound source is generated from a gain code corresponding to the particular first sound source sample and the particular first sound source sample in the unit 109. The synthesis sound source is stored in the adaptive code book 104 as a first sound source sample, and the particular first sound source sample is abandoned.

In addition, in the LPC synthesizing unit 107, acoustic feeling for each of the speech data is weighted with the linear prediction coefficient, a frequency emphasizing filter coefficient and a long-term prediction coefficient obtained by performing a long-term prediction analysis for each of the speech data. Also, the sound source samples are found out from sub-frames obtained by dividing each of analyzing blocks in the adaptive code book 104 and the probabilistic code book 105.

Also, the linear prediction coefficient analysis performed in the LPC analyzing unit 103 is utilized in various coding methods. A conventional linear prediction coefficient analysis is described with reference to FIG. 2. FIG. 2 is a block diagram of a conventional linear prediction coefficient analyzing apparatus.

As shown in FIG. 2, when a speech is input to an input speech receiving unit 112 of a conventional linear prediction coefficient analyzing apparatus 111, the speech is converted into a plurality of speech signals Xi respectively having a prescribed analyzing period, and each of the speech signals Xi output time-sequentially is multiplied by a window coefficient Wi in a window putting unit 113. For example, a coefficient in a Hamming window, a Hanning window, a Blackman-Harris window or the like is used as the window coefficient Wi. A window putting processing in the unit 113 is formulated as follows.

$$Yi = Wi * Xi$$

Here, i denotes the numbers of the speech signals (i=1 to L), L denotes the number of speech signals, and Yi denotes a plurality of window-processed speech signals.

Thereafter, an auto-correlation analysis is performed for the window-processed speech signals Yi in an auto-correlation analyzing unit 114 as follows.

$$Vj = \sum_{i=j+1}^{L} Yi * Yi - j$$

Here, Vj denotes a plurality of auto-correlation functions, and j denotes the numbers of the auto-correlation functions.

Thereafter, a linear prediction analysis based on an auto-correlation method is performed in a linear prediction coefficient analyzing unit 115 to obtain a linear prediction coefficient for each of the speech signals. The linear prediction analysis is disclosed in various speech information processing documents such as "The Autocorrelation Method" in a literature written by L. R. Labiner and R. W. Schafer "Digital Processing of Speech Signals" pp.401–403.

Also, because the speech information obtained from the input speech is coded according to one of improved CELP coding methods, a plurality of speech signals indicating the speech information can be transmitted at a very low bit rate. However, because the speech information is compressed according to a speech vocalizing model, sound information including the speech information cannot be appropriately processed according to any of the improved CELP coding methods. That is, in cases where a background noise or a set noise exists with the speech signals, there is a drawback that the speech signals cannot be efficiently coded and allophone occurs in a reproduced speech. To solve this drawback, a method for reducing a noise existing with the input speech signals is proposed. For example, a noise existing with the speech signals is reduced by a noise canceler in the standardized PSI-CELP coding method before the speech signals are coded. The noise canceler is composed of a Kalman filter. That is, the existence of a speech is detected and the speech is adaptively controlled by the Kalman filter to reduce a noise existing with the speech. Therefore, the background noise can be reduced in some degree by the noise canceler. However, a noise having a high level or a noise included in a speech cannot be effectively reduced or subtracted.

As a more effective noise reduction method, a spectrum subtraction method is disclosed in a literature written by S. F. Boll "Suppression of Acoustic Noise in Speech Using Spectral Subtraction" IEEE, Trans. ASSP. Vol.27, No.2, pp.113–120, 1979. In the spectrum subtraction method, a discrete Fourier transformation is performed to convert a plurality of input speech signals into a plurality of spectra, and one or more noises are subtracted from the spectra. This method is mainly applied for a speech input unit of a speech recognition apparatus. A conventional noise subtraction apparatus in which the spectrum subtraction method is applied to subtract a noise included in a speech signal from the speech signal is described with reference to FIG. 4.

As shown in FIG. 4, a noise spectrum is assumed in a first procedure, and a noise of which the spectrum is assumed is subtracted from a speech signal in a second procedure. In the first procedure, a plurality of noise signals Sn indicating a noise is input in series to an analog-digital (A/D) converter 122 of a conventional noise subtraction apparatus 121, and the noise signals Sn are converted into a plurality of digital noise signals. In this case, any speech signal is not included in the noise signals Sn. Thereafter, a discrete Fourier transformation is performed in a Fourier transforming unit 123 for each frame of digital noise signals, and a noise spectrum is obtained for each frame. Each frame is composed of a series of digital noise signals having a constant time length. Thereafter, an average noise spectrum is obtained in a noise analyzing unit 124 by averaging a plurality of noise spectra, and the average noise spectrum is stored in a noise spectrum storing unit 125 as a representative noise spectrum of the noise. The first procedure is performed for various noise signals indicating various types of noises, and a plurality of representative noise spectra indicating the various types of noises are stored in the storing unit 125. In the second procedure, a plurality of speech signals Ss which indicate a speech including a noise are input in series to an A/D converter 126, and a plurality of digital speech signals are obtained. Thereafter, a discrete Fourier transformation is performed in a Fourier transforming unit 127, and a speech spectrum including an actual noise spectrum is obtained. Thereafter, one representative noise spectrum matching with the actual noise spectrum is read out from the storing unit 125, and the representative noise spectrum read out is subtracted from the speech spectrum in a noise subtracting unit 128 to cancel the actual noise spectrum. Thereafter, an inverse Fourier transformation is performed for the speech spectrum in an inverse Fourier transforming unit 129, and a speech output signal So is obtained.

To obtain each of the noise and speech spectra, an amplitude spectrum for each of noises and speech is calculated. That is, a real component of a norm defined in a complex plane for the amplitude of a noise or speech and an imaginary component of the norm are respectively squared, the real component squared and the imaginary component squared are added each other to obtain a squared absolute value, and a square root of the squared absolute value is calculated as the amplitude spectrum. Also, in cases where the inverse Fourier transformation is performed for the amplitude spectrum from which a noise spectrum is subtracted, a phase component of each speech signal Ss is used as a phase component of the amplitude spectrum.

2.2. PROBLEMS TO BE SOLVED BY THE INVENTION (1) To set a speech coding apparatus and a decoding apparatus in a small-sized apparatus such as a portable telephone, it is required to reduce a memory capacity of a read only memory (ROM) in which a plurality of first sound source samples of an adaptive code book and a plurality of second sound source samples of a probabilistic code book are stored. However, because a large number of code vectors are required to store a plurality of fixed sound sources representing the second sound source samples in the conventional speech coding apparatus 101, it is difficult to set the apparatus 101 in the small-sized apparatus. To reduce the number of code vectors stored in the ROM, for example, a long vector is shifted to be used as a plurality of code vectors. However, similar code vectors are obtained by shifting the long vector, and there is a drawback that a quality of reproduced speech deteriorates as compared with that reproduced by using a large number of code vectors different from each other. Also, because it is required to calculate a code vector each time the code vector is generated, there is another drawback that a large volume of calculation is required.

(2) Also, because the VSELP coding method and the PSI-CELP coding method are obtained by improving the CELP coding method, the same processing is performed for any input voice or speech in the VSELP coding method and the PSI-CELP coding method. Therefore, the input voice or speech cannot be efficiently coded.

Pieces of speech information recorded in a real circumstance greatly differ from each other in a viewpoint of local characteristics. Each of the speech information is composed of one or more voice portions and one or more silent portions. Voice of the voice portion is composed of one or more consonants and one or more vowels. Each consonant is classified into a voiceless consonant and a voiced consonant.

Each vowel is divided into a vowel stationary portion and a vowel transitional portion. In the vowel stationary portion, a voice pitch and a movement of a mouth are stable. In the vowel transitional portion, the voice pitch and the mouth movement always change. Therefore, because the silent portion, the voiceless consonant, the voiced consonant, the vowel stationary portion and the vowel transitional portion have different characteristics, an optimum coding method exists in each of them.

In cases where the CELP coding method is adopted, how the voice information is coded while considering the local characteristics is described. Because there is no voice in a period of the silent portion, only a noise in the real circumstance exists in the silent portion, and a time length of the silent portion is required to be informed. Therefore, time information of the silent portion can be coded at a very low bit rate by omitting the sound source samples. The voiceless consonant is classified into an affricate such as a phoneme /p/, /t/ or the like and a fricative such as a phoneme /s/, /h/ or the like. Because a voice power of the affricate minutely changes and it is important to recognize the minute change, it is preferable that the affricate be coded in a unit of a short frame length. Therefore, the first sound source samples stored in the adaptive code book 104 are not required to code the affricate. Also, in case of the fricative, a radiance characteristic and a time length are important. Therefore, the first sound source samples stored in the adaptive code book 104 are not required to code the fricative. In case of the voiced consonant, a minute voice power change, vocal tract information and sound source information are important. Therefore, the most large volume of information is required to code the voiced consonant. In the vowel stationary portion, a plurality of waves having similar shaped waveforms are formed in series. Therefore, the vowel stationary portion can be coded by using a small volume of information in cases where the first sound source samples stored in the adaptive code book 104 are used. In the vowel transitional portion, the change of the vocal tract information and the sound source information is larger than that in the vowel stationary portion, and a voice power in the vowel transitional portion is large. Therefore, the degradation of a tone quality can be easily noticed. Accordingly, a large volume of information is required in the same manner as in the voiced consonant to code the vowel transitional portion.

Therefore, in cases where a coding method is locally changed for each of the silent portion, the affricate, the fricative, the voiced consonant, the vowel stationary portion and the vowel transitional portion to adaptively distribute pieces of information, the input speech can be efficiently coded. That is, because local characteristics of the speech information recorded in the real circumstance greatly differ from each other, in cases where the speech information are adaptively coded while positively using the local characteristics, a coding efficiency can be improved, and a plurality of synthesis speeches can be preferably obtained at a lower average bit rate. Based on this idea, a coding method in which a plurality of coding modules are used is proposed. For example, a variable bit-rate speech coding method is disclosed in the paper 2-Q-23 read in the Spring research convention of Japanese Acoustic Society, and a QCELP method is proposed by the Qaucom company. The QCELP method is adopted as a standard coding method (TIA-IS96) for a digital cellular phone in the North America.

However, one of a plurality of coding modules is selected according to a simple rule in the variable bit-rate speech coding method and the QCELP method. Therefore, there is a probability that a coding module not adapted for a piece of speech information is selected by mistake, and there is a drawback that a rasping allophone occurs. To solve this drawback in a speech coding apparatus operated according to the analysis by synthesis method, the speech information is coded by using each of all coding modules, a plurality of coding distortions corresponding to the coding modules are compared with each other, and a coding module corresponding to a coding distortion which is the smallest among the coding distortions is adopted as the most adaptive coding module. However, in this case, a volume of calculation required to determine the adaptive coding module extremely becomes large, and it is difficult to arrange the speech coding apparatus operated according to the above selection method in a small sized communication apparatus such as a portable telephone. Also, it is difficult to make a complicated rule for a correct selection of the adapted coding module for the purpose of avoiding the occurrence of the allophone.

(3) Also, in cases where the window coefficients Wi are utilized in the conventional linear prediction coefficient analyzing apparatus 111, because a value of each window coefficient Wi at a central portion of an analyzing period is high and values of each window coefficient Wi at both end portions of the analyzing period is very low, there is a drawback that a piece of information for each window-processed speech signal Yi represents a piece of information for each speech signal Xi at the central portion of the analyzing period. To prevent this drawback, as shown in FIG. 3, a rear part of preceding speech signal Xi−1 at a rear portion of a preceding analyzing period, a current speech signal Xi at a current analyzing period and a front part of succeeding speech signal Xi+1 at a front portion of a succeeding analyzing period output from the input speech receiving unit 112 in that order are multiplied by a window coefficient Wi for the current speech signal Xi in a normal CELP coding method. In this case, a piece of information about the entire current speech signal Xi can be reflected on a piece of information for a current window-processed speech signal Yi.

However, because the multiplication is waited until the front portion of the succeeding analyzing period passes, a coding process performed in a codec is delayed by a period equivalent to the front portion of the succeeding analyzing period. To reduce this coding process delay, the front portion of the succeeding analyzing period is shortened to several mil seconds in a codec used for a digital moving communication such as a portable telephone. In this case, it is difficult that the information about the entire current speech signal Xi is reflected on the information for the current window-process ed speech signal Yi. Therefore, when a piece of speech such as a voiced consonant in which a speech spectrum largely changes is input to the input speech receiving unit 112, there is a drawback that a quality of reproduced speech locally deteriorates.

(4) Also, though the spectrum subtraction method performed in the conventional noise subtraction apparatus 121 is more effective to subtract a noise from a speech, in cases where the method is applied for a real-time speech processing apparatus, there are many drawbacks in a noise assuming method or a manufacturing cost of the apparatus. A first drawback is that the assumption of a noise spectrum is difficult because a position of a speech signal existing in pieces of data cannot be specified. A second drawback is that a calculation volume in the apparatus is large. A third drawback is that a memory capacity required to store the noise spectra in a random access memory is large. A fourth drawback is that a speech spectrum from which a noise spectrum having a high intensity is subtracted is largely distorted and a quality of a reproduced speech deteriorates.

SUMMARY OF THE INVENTION

A first object of the present invention is to provide, with due consideration to the drawbacks of such a conventional speech coding apparatus, a speech coding apparatus in which a capacity of a memory required to store a plurality of sound source samples is reduced without any deterioration of a quality of reproduced speech and without any increase of a calculation volume.

Also, a second object of the present invention is to provide a speech coding apparatus in which a coding module adapted for a speech signal is correctly selected from a plurality of coding modules at a small volume of calculation to avoid the occurrence of the allophone.

Also, a third object of the present invention is to provide a linear prediction coefficient analyzing apparatus in which a piece of information about an entire current digital signal is reliably reflected on a piece of information for a current window-processed digital signal without any coding process delay.

Also, a fourth object of the present invention is to provide a noise reducing apparatus in which a noise spectrum is easily assumed at a small calculation volume and a small memory capacity without any deterioration of a reproduced speech quality even though a noise intensity is high. The second object is achieved by the provision of a speech coding apparatus, comprising:

coding module storing means for storing a plurality of coding modules;

speech analyzing means for analyzing a sample speech signal to obtain a plurality of sample characteristic parameters indicating sample speech characteristics of the sample speech signal, calculating a coding distortion from the sample characteristic parameters in each of the coding modules stored in the coding module storing means and analyzing a speech signal to obtain a plurality of characteristic parameters indicating speech characteristics of the speech signal;

statistic processing means for statistically processing the sample characteristic parameters and the coding distortions obtained by the speech analyzing means to obtain a coding module selecting rule;

coding module selecting means for selecting one of the coding modules stored in the coding module storing means as an appropriate coding module, in which a coding distortion for the characteristic parameters obtained by the speech analyzing means is minimized, according to the coding module selecting rule obtained by the statistic processing means; and coding means for coding the speech signal obtained by the speech analyzing means in the appropriate coding module selected by the coding module selecting means.

In the above configuration, a sample speech signal is analyzed by the speech analyzing means to obtain a plurality of sample characteristic parameters. Thereafter, a coding distortion is calculated from the sample characteristic parameters in each of the coding modules stored in the coding module storing means. Thereafter, the sample characteristic parameters and the coding distortions are statistically processed in the statistic processing means to obtain a coding module selecting rule. Therefore, the coding module selecting rule can be easily obtained.

Thereafter, a speech signal to be distinguished is analyzed by the speech analyzing means to obtain a plurality of characteristic parameters. Thereafter, one of the coding modules is selected as an appropriate coding module according to the coding module selecting rule and the characteristic parameters. In this case, a coding distortion calculated in the appropriate coding module for the characteristic parameters is lower than those calculated in the other coding modules for the characteristic parameters. Therefore, the selection of the appropriate coding module can be easily performed at a low calculation volume.

Thereafter, the speech signal is coded in the appropriate coding module by the coding means.

The first object is achieved by the provision of a speech coding apparatus, comprising:

linear prediction coding analyzing means for analyzing a plurality of speech signals indicating an input speech to obtain a linear prediction coefficient for each of the speech signals;

an adaptive code book for storing a plurality of past synthesis sound sources;

a probabilistic code book for storing a plurality of fixed sound sources;

sound source adding means for taking out each of the past synthesis sound sources from the adaptive code book as a first candidate for an appropriate past synthesis sound source, reading out each of the fixed sound sources in a first direction from the probabilistic code book as a second candidate for an appropriate fixed sound source, reading out each of the fixed sound sources in a second direction opposite to the first direction from the probabilistic code book to obtain a reverse fixed sound source as a third candidate for the appropriate fixed sound source, adding each of the first candidates and each of the second candidates to generate a first synthesis sound source, and adding each of the first candidates and each of the third candidates to generate a second synthesis sound source;

linear prediction coefficient synthesizing means for synthesizing a first synthesis speech from the linear prediction coefficient obtained by the linear prediction coding analyzing means and each of the first synthesis sound sources generated by the sound source adding means for each of the speech signals and synthesizing a second synthesis speech from the linear prediction coefficient and each of the second synthesis sound sources generated by the sound source adding means for each of the speech signals;

sound source selecting means for calculating a first distance between each of the first synthesis speeches and a corresponding speech signal for each of the speech signals, a second distance between each of the second synthesis speeches and a corresponding speech signal for each of the speech signals, and selecting a particular synthesis speech, which corresponds to a particular distance having a minimum value among those of the first and second distances, from among the first and second synthesis speeches for each of the speech signals; and synthesis speech unifying means for unifying the particular synthesis speeches for the speech signals to a series of particular synthesis speeches indicating a coded speech.

In the above configuration, each of the fixed sound sources stored in the probabilistic code book is read out in a first direction to the sound source adding unit as a second candidate for an appropriate fixed sound source. Also, each of the fixed sound sources is read out in a second direction opposite to the first direction to the sound source adding unit to obtain a reverse fixed sound source as a third candidate for the appropriate fixed sound source. Therefore, because two types of fixed sound sources are generated from each of the fixed sound sources and because two candidates for the appropriate fixed sound source are generated from each of the fixed sound sources, a size of the probabilistic code book can be reduced to half on condition that a speech reproduced from the coded speech does not deteriorate.

Also, because two fixed sound sources are generated from each of the fixed sound sources by merely reading out each of the fixed sound sources in two directions opposite to each other, a size of the probabilistic code book can be reduced to half without any increase of calculation volume.

The third object is achieved by the provision of a linear prediction coefficient analyzing apparatus, comprising:

extracting means for extracting a plurality of partial analyzing periods from an analyzing period for a digital signal and extracting a plurality of partial digital signals at the partial analyzing periods from the digital signal;

window coefficient multiplying means for multiplying each of the partial digital signals extracted by the extracting means by a window coefficient to generate a window-processed partial digital signal for each of the partial analyzing periods extracted by the extracting means;

auto-correlation analyzing means for analyzing an auto-correlation of each of the window-processed partial digital signals generated by the window coefficient multiplying means to generate an auto-correlation function from each of the window-processed partial digital signals for each of the partial analyzing periods;

auto-correlation function synthesizing means for weighting each of the auto-correlation functions generated by the auto-correlation analyzing means with a weighting factor to generate a weighted auto-correlation function for each of the partial analyzing periods and adding the weighted auto-correlation functions each other to generate a synthesized auto-correlation function; and linear prediction coefficient analyzing means for performing a linear prediction analysis for the synthesized auto-correlation function generated by the auto-correlation function synthesizing means to obtain a linear prediction coefficient for the digital signal.

In the above configuration, information such as speech information is input to a coding apparatus such as a speech coding apparatus of a codec, the information is converted into a plurality of digital signals such as a plurality of speech signals. The digital signals are transmitted at analyzing periods. In this case, a linear prediction coefficient is required to code each of the digital signals. That is, a plurality of partial analyzing periods are extracted from each analyzing period by the extracting means. Also, a plurality of partial digital signals at the partial analyzing periods are extracted from each digital signal. Each of the partial digital signals is multiplied by a window coefficient by the window coefficient multiplying means to generate a window-processed partial digital signal for each of the partial analyzing periods. Thereafter, an auto-correlation of each of the window-processed partial digital signals is analyzed by the auto-correlation analyzing means to generate an auto-correlation function from each of the window-processed partial digital signals for each of the partial analyzing periods. Thereafter, each of the auto-correlation functions is weighted with a weighting factor to generate a weighted auto-correlation function for each of the partial analyzing periods and adding the weighted auto-correlation functions each other by the auto-correlation function synthesizing means to generate a synthesized auto-correlation function. Thereafter, a linear prediction analysis is performed for the synthesized auto-correlation function by the linear prediction coefficient analyzing means to obtain a linear prediction coefficient for each digital signal.

Accordingly, because each of current partial digital signals extracted from a current digital signal is multiplied with a window coefficient and because any succeeding digital signal is not required to process the current digital signal, a piece of information about an entire current-digital signal can be reliably reflected on pieces of information for a plurality of current window-processed partial digital signals without any coding process delay. That is, a linear prediction coefficient for each digital signal can be obtained without any coding process delay.

The fourth object is achieved by the provision of a noise reducing apparatus, comprising:

speech signal receiving means for receiving a plurality of frames of analog speech signals in which a noise exists and converting the frames of analog speech signals into a plurality of frames of digital speech signals one after another;

Fourier transforming means for performing a discrete Fourier transformation for each of the frames of digital speech signals obtained by the speech signal receiving means and producing an input spectrum and a phase spectrum corresponding to each of the frames of digital speech signals for each of frequency values;

noise assuming means for selecting a particular input spectrum having a minimum value from among a current input spectrum, produced by the Fourier transforming means, corresponding to a current frame of digital speech signals and a predetermined number of past input spectra, produced by the Fourier transforming means, corresponding to past frames of digital speech signals preceding to the current frame and assuming the particular input spectrum as a noise spectrum corresponding to the current frame of digital speech signals for each of the frequency values;

noise reducing degree determining means for determining a degree of a noise reduction according to each of the frames of digital speech signals obtained by the speech signal receiving means;

noise reducing means for adjusting a value of each of the noise spectra assumed by the noise assuming means according to the degree of the noise reduction determined by the noise reducing degree determining means to produce an adjusted noise spectrum having an adjusted value corresponding to the current frame of digital speech signals for each of the frequency values, subtracting the adjusted noise spectrum from the current input spectrum produced by the Fourier transforming means for each of the frequency values to reduce the noise existing in the current frame of digital speech signals, and producing a noise-reduced input spectrum corresponding to the current input spectrum for each of the frequency values; and inverse Fourier transforming means for performing an inverse Fourier transformation for the noise-reduced input spectra produced by the noise reducing means according to the phase spectra, produced by the Fourier transforming means, corresponding to the current frame of digital speech signals, producing a current frame of first-order output-signals corresponding to the current frame of digital speech signals, and outputting a plurality of frames of first-order output signals corresponding to the frames of analog speech signals received by the speech signal receiving means, one after another as a plurality of frames of output signals.

In the above configuration, a plurality of frames of digital speech signals obtained by the speech signal receiving means are transformed into a plurality of input spectra and a plurality of phase spectra corresponding to the frames for all frequency values by the Fourier transforming means. A degree of a noise reduction is determined according to each of the frames of digital speech signals by the noise reducing degree determining means.

Thereafter, a noise spectrum corresponding to each frame of digital speech signals for each frequency value is assumed from the input spectra by the noise assuming means. Because noise steadily exists in each frame of analog speech signals as a background, the noise always has a minimum intensity among those of the analog input signals. Therefore, a particular input spectrum having a minimum value is selected from among a current input spectrum and a predetermined number of past input spectra corresponding to the current and a predetermined number of past frames of digital speech signals, and the particular input spectrum is assumed as a noise spectrum corresponding to the current frame of digital speech signals by the noise assuming means.

Thereafter, a value of the noise spectrum is changed to an adjusted noise spectrum having an adjusted value according to a degree of a noise reduction determined according to the current frame of digital speech signals, the adjusted noise spectrum is subtracted from the current input spectrum by the noise reducing means for each frequency value, and a noise-reduced input spectrum in which the noise existing in the current frame of digital speech signals is reduced at a moderate degree is produced for each frequency value.

Thereafter, the noise-reduced input spectra for all frequency values are inversely transformed into a current frame of first-order output signals by the inverse Fourier transforming means according to the phase spectra corresponding to the current frame of digital speech signals produced by the Fourier transforming means, and a plurality of frames of first-order output signals are output one after another as a plurality of frames of output signals corresponding to the frames of analog speech signals.

Accordingly, because an input spectrum having a minimum value among values of input spectra corresponding to the current frame and one or more past frames of digital speech signals is assumed as a noise spectrum corresponding to the current frame for each frequency value in the noise assuming means, regardless of whether a noise is included in the current frame of analog speech signals, a noise spectrum can be reliably assumed by the noise assuming means. That is, even though it is difficult to judge whether or not a speech exists in a frame of analog speech signals, a noise existing with the speech or existing with a non-speech signal can be reliably detected, and the noise can be reduced at a moderate degree by the noise reducing means.

It is preferred that the noise reducing apparatus further comprise:

linear prediction coefficient analyzing means for performing a linear prediction analysis for each of the frames of digital speech signals obtained by the speech signal receiving means and producing a linear prediction coefficient for each of the frames of digital speech signals; and spectrum emphasizing means for emphasizing a spectrum of each frame of the output signals output from the inverse Fourier transforming means, the frames of output signals emphasized being output.

In the above configuration, features of each input spectrum envelope are emphasized by the spectrum emphasizing means by using the linear prediction coefficient. Therefore, even though a noise intensity is high, the degradation of a reproduced speech quality can be prevented.

Also, it is preferred that the noise reducing apparatus further comprise:

spectrum compensating means for looking for a particular noise-reduced input spectrum, produced by the noise reducing means, having a value lower than a predetermined value and compensating the particular noise-reduced input spectrum for an excessive subtraction of the adjusted noise spectrum, the particular noise-reduced input spectrum compensated being inversely transformed by the inverse Fourier transforming means.

In the above configuration, because the particular noise-reduced input spectrum having a low value is compensated for an excessive subtraction of the adjusted noise spectrum, an allophone feeling at a frequency value relating to the particular noise-reduced input spectrum compensated can be reduced. Also, it is preferred that the noise reducing apparatus further comprise:

waveform matching means for matching a waveform of a current frame of output signals output from the inverse Fourier transforming means to a waveform of a preceding frame of output signals, output from the inverse Fourier transforming means, preceding the current frame, a plurality of frames of output signals matched being output one after another.

In the above configuration, each frame of output signals is matched to adjacent frames of output signals by the waveform matching means. Therefore, a quality of a reproduced sound obtained by coding and decoding the frames of output signals can be improved.

BRIEF DESCRIPTION OF THE DRAWINGS

The objects, features and advantages of the present invention will be apparent from the following description taken in conjunction with the accompanying drawings, in which:

FIG. 7 shows a plurality of characteristic parameters and signal/noise (S/N) ratios stored in a coding distortion storing unit of the selecting rule preparing apparatus shown in FIG. 6;

DETAIL DESCRIPTION OF THE EMBODIMENTS

Preferred embodiments of a speech coding apparatus according to the present invention are described with reference to drawings.

A first embodiment of the present invention is initially described to achieve the second object of the present invention.

Figure 5:
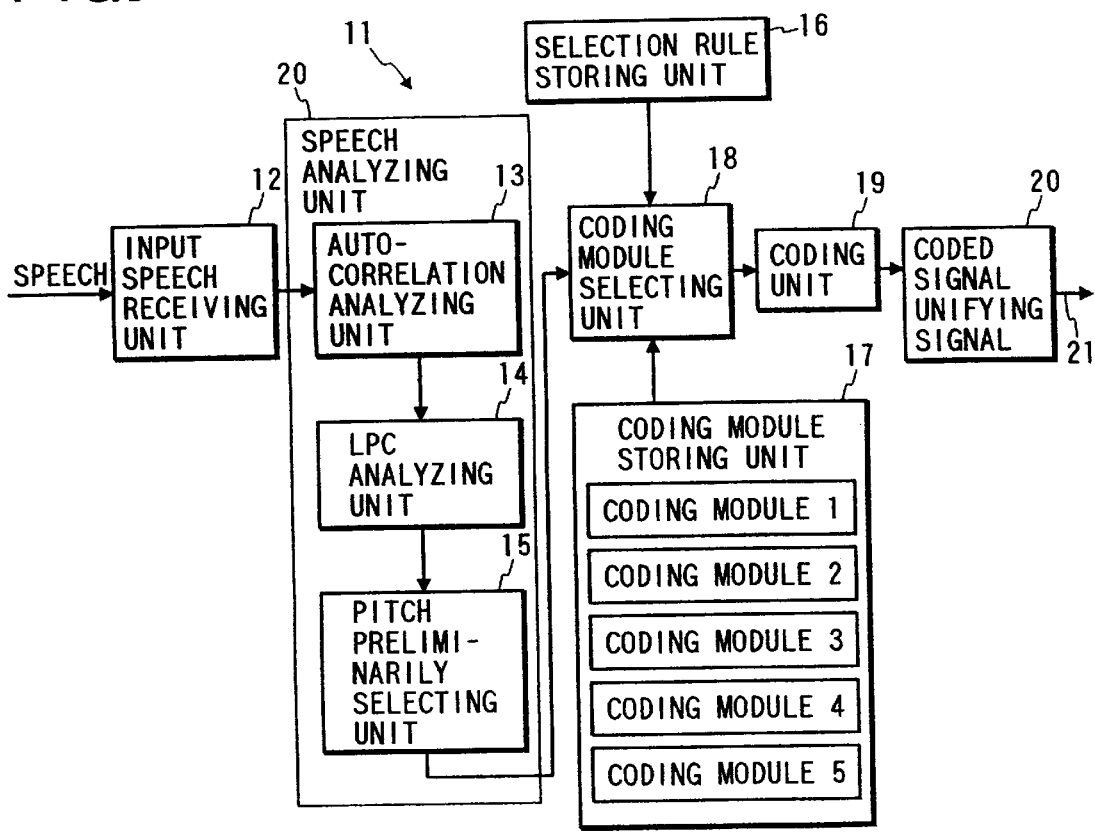
FIG. 5 is a block diagram of a speech coding apparatus according to a first embodiment of the present invention.

FIG. 5 is a block diagram of a speech coding apparatus according to a first embodiment of the present invention. As shown in FIG. 5, a speech coding apparatus 11 comprises:

an input speech receiving unit 12 for receiving a voice or speech and converting the voice or speech into a plurality of digital speech signals having the same prescribed time length;

an auto-correlation analyzing unit 13 for dividing each of the digital speech signals time-sequentially output from the unit 12 into a plurality of digital analyzing signals at analyzing periods which each correspond to a silent portion of a voice, an affricate of the voice, a fricative of a voiceless consonant, a voiced consonant of a voiceless consonant, a vowel stationary portion of a vowel or a vowel transitional portion of a vowel, analyzing an auto-correlation of each analyzing signal and obtaining an auto-correlation coefficient and pieces of power information for each digital analyzing signal;

a linear prediction coefficient (LPC) analyzing unit 14 for obtaining a linear prediction coefficient for each of the digital analyzing signals by analyzing the auto-correlation coefficients obtained in the analyzing unit 13;

a pitch preliminarily selecting unit 14 for inverse-filtering each of the digital analyzing signals with the corresponding linear prediction coefficient obtained in the LPC analyzing unit 14 to obtain a linear prediction residual waveform for each digital analyzing signal, analyzing a long-term primary correlation of the linear prediction residual waveform for each digital analyzing signal and selecting a candidate of a fundamental frequency (or pitch) of the long-term primary correlation for each digital analyzing signal;

a selection rule storing unit 16 for storing a coding module selecting rule;

a coding module storing unit 17 for storing a plurality of coding modules respectively corresponding to a silent portion of a voice, an affricate of a voiceless consonant of the voice, a fricative of the voiceless consonant of the voice, a voiced consonant of the voice, a vowel stationary portion of a vowel of the voice or a vowel transitional portion of a vowel of the voice;

a coding module selecting unit 18 for selecting an appropriate coding module most appropriate to the coding of each digital analyzing signal from the coding modules stored in the coding module storing unit 17 according to the coding module selecting rule stored in the selection rule storing unit 16 by using a first group of speech characteristics obtained in the auto-correlation analyzing unit 13 such as the auto-correlation coefficient, the power information at a corresponding analyzing period, a power changing degree at the corresponding analyzing period and a difference in the power information of the digital analyzing signal between the corresponding analyzing period and an analyzing period previous to the corresponding analyzing period, a second group of speech characteristics obtained in the LPC analyzing unit 14 such as the linear prediction coefficient, a spectral envelope and a difference in spectrum between a corresponding analyzing period and an analyzing period previous to the corresponding analyzing period and a third group of speech characteristics obtained in the pitch preliminarily selecting unit 15 such as a power of the linear prediction residual waveform at a corresponding analyzing period, a power of a long-term prediction residual waveform at the corresponding analyzing period, a power difference in the linear prediction residual waveform between the corresponding analyzing period and a previous analyzing period previous to the corresponding analyzing period, a power difference in the long-term prediction residual waveform between the corresponding analyzing period and the previous analyzing period, a power changing degree of the linear prediction residual waveform at the corresponding analyzing period, a power changing degree of the long-term prediction residual waveform at the corresponding analyzing period and the long-term prediction coefficient of the linear prediction residual waveform,;

a coding unit 19 for coding each digital analyzing signal to a coded signal in the appropriate coding module selected in the module selecting unit 18; and a coded signal unifying unit 20 for serially gathering a plurality of coded signals obtained by coding the digital analyzing signals of the digital speech signals in the coding unit 19, unifying the coded signals to a series of coded signals and outputting the series of coded signals to a transmission line 21.

The candidate of the fundamental frequency (or pitch) obtained in the pitch preliminarily selecting unit 15 for each digital analyzing signal is used for a preliminary selection of an adaptive code book and is used for an acoustic feeling weighting filter. The auto-correlation analyzing unit 13, the LPC analyzing unit 14 and the pitch preliminarily selecting unit 15 compose a speech analyzing unit 21 in which characteristic parameters for each of the digital analyzing signals are obtained by analyzing speech characteristics of the digital analyzing signals.

Next, a preparing method of the coding module selecting rule stored in advance in the selection rule storing unit 16 is described with reference to FIGS. 6 to 8.

Figure 6:
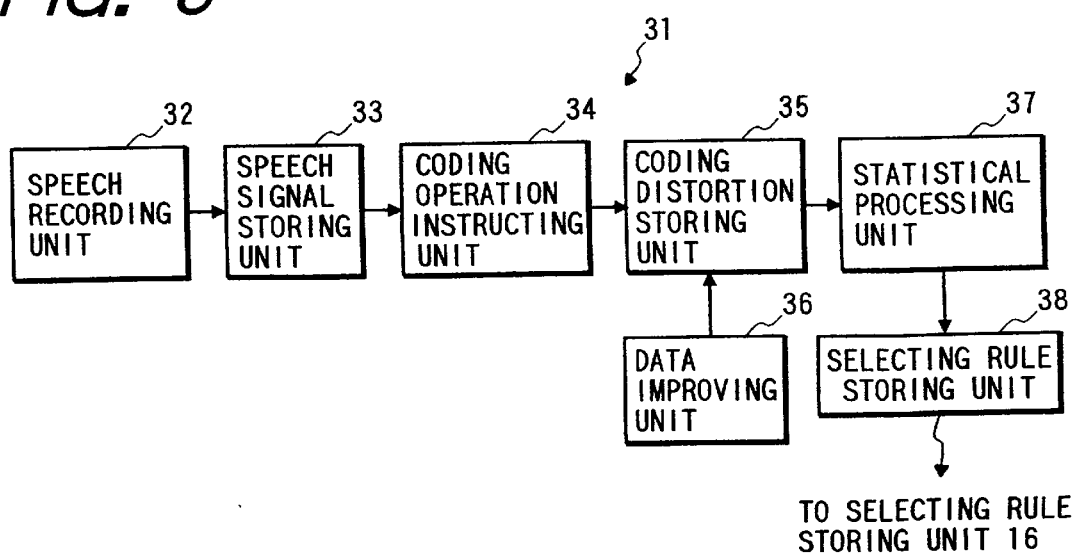
FIG. 6 is a block diagram of a selecting rule preparing apparatus for preparing a coding module selecting rule utilized in the speech coding apparatus shown in FIG. 5.

FIG. 6 is a block diagram of a selecting rule preparing apparatus for preparing the coding module selecting rule utilized in the speech coding apparatus 11.

As shown in FIG. 6, a selecting rule preparing apparatus 31 comprises:

a speech recording unit 32 for recording a plurality of sample speeches vocalized by various persons and converting the sample speeches into digital sample speech signals;

a speech signal storing unit 33 for storing the digital sample speech signals;

a coding operation instructing unit 34 for operating the speech analyzing unit 21 shown in FIG. 5 to calculate a plurality of characteristic parameters of each of digital sample analyzing signals obtained from each of the digital sample speech signals stored in the speech signal storing unit 33 and calculating a coding distortion (or a signal/noise ratio) for each of the characteristic parameters according to each of the coding modules stored in the coding module storing unit 17; and a coding distortion storing unit 35 for storing the coding distortions respectively specified by an analyzing period, a group of characteristic parameters and a coding module.

As an example, the coding distortions for each coding module and the characteristic parameters which are stored in the coding distortion storing unit 35 for each analyzing period are shown in FIG. 7. The coding distortions and the characteristic parameters are determined on condition that a speech "Ba" vocalized by a man is analyzed at analyzing periods of 21 mil second.

As shown in FIG. 7, a voice power, a primary auto-correlation coefficient, a secondary auto-correlation coefficient, a voice power ratio of a voice power at a head portion of an analyzing period and that at a rear portion of the analyzing period (the ratio is obtained by dividing a smaller voice power by a larger voice power), a long-term prediction coefficient for a candidate of a fundamental frequency of a long-term primary correlation having the highest value in a linear prediction residual waveform, a pulse value indicating a pulse property of a long-term residual waveform of the linear prediction residual waveform, a normalization power of the long-term residual waveform of the linear prediction residual waveform, and the candidate for the fundamental frequency (or pitch) of the long-term primary correlation having the highest value in the linear prediction residual waveform are stored as the characteristic parameters for each analyzing period. Also, a coding distortion indicated by an S/N ratio for each of five coding modules and the number of the appropriate coding module for which the coding distortion is smallest (or the S/N ratio is highest) are stored for each analyzing period.

Also, the selecting rule preparing apparatus 31 further comprises a data improving unit 36 for improving the characteristic parameters and the coding distortions stored in the coding distortion storing unit 35, a statistical processing unit 37 for statistically processing the characteristic parameters and the coding distortions stored in the coding distortion storing unit 35 and preparing the coding module selecting rule, and a selection rule storing unit 38 for temporarily storing the coding module selecting rule.

In the data improving unit 36, the characteristic parameters and the coding distortions stored in the coding distortion storing unit 35 are corrected by an operator if necessary. Therefore, an operator's will can be influenced on the characteristic parameters and the coding distortions. For example, in cases where the number of information bits in a coding module A is larger than that in a coding module B and an S/N ratio indicating a coding distortion for the coding module A is slightly higher than that for the coding module B, the coding module A is selected as the appropriate coding module because a sound quality reproduced according to the coding module A is slightly superior than that reproduced according to the coding module B. However, when an operator judges that the decrease of information bits is important than a sound quality slightly improved, the appropriate coding module is rewritten to the coding module B by the operator because the number of information bits in the coding module B is small. Therefore, when the appropriate coding module is rewritten to the coding module B at each of a large number of analyzing periods, a selecting ratio of the coding module B can be humanly increased, and a plurality of synthesis speeches can be preferably obtained at a lower average bit rate.

In the statistical processing unit 37, the coding module selecting rule is statistically prepared by using a neural network or according to a vector quantization, a learning vector quantization or a Bayesian judgement. In this embodiment, the preparation of the coding module selecting rule is performed by using a most simple neural network in which perceptrons are arranged in three layers.

Figures 8, 9:
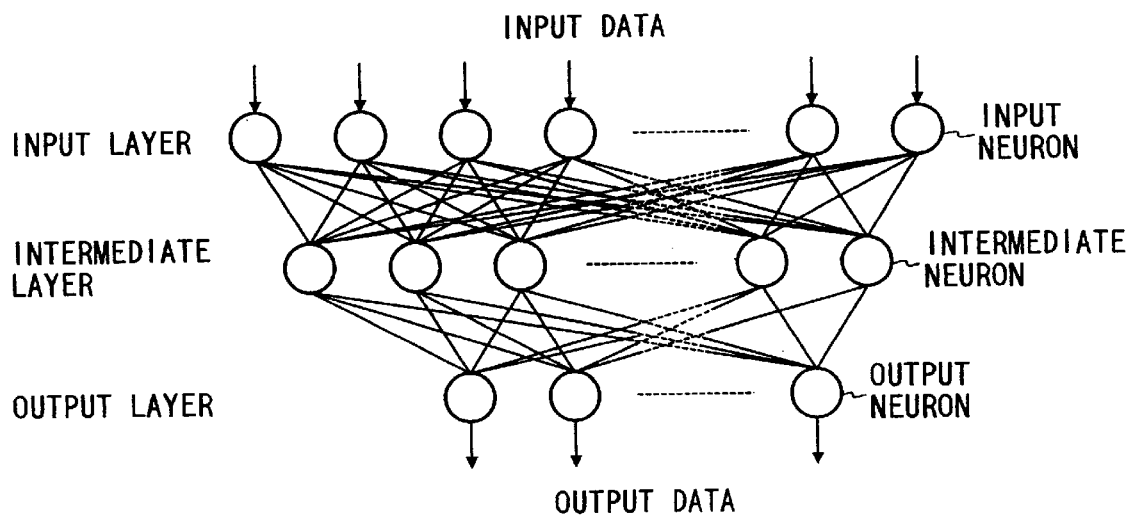
FIG. 8 shows a neural network which is constructed in a statistic processing unit of the selecting rule preparing apparatus shown in FIG. 6 and is set in a coding module selecting unit of the speech coding apparatus shown in FIG. 5.
FIG. 9 shows a bit rate in each of five coding modules used to estimate the selection of an appropriate coding module in the neural network shown in FIG. 8.

As shown in FIG. 8, in general, when a plurality of pieces of input data Ii are given to input neurons arranged in an input layer, the input data Ii are weighted with a plurality of weighting factors Wji and are processed according to a sigmoid function in the neural network, and a plurality of pieces of output data Oj indicating information required to a judgement are output from output neurons of an output layer. The processing in the neural network is formulated as follows.

$$Oj = f\left(\sum_i Wji * Ii\right)$$

$f(x) = 1/(1 + \exp(-x))$ : sigmoid function

Here, i ranges from 1 to $i_{max}$ ($i_{max}$ is the number of input neurons), and j ranges from 1 to $j_{max}$ ($j_{max}$ is the number of output neurons).

In this embodiment, a neural network in which a plurality of pieces of output data Oj indicating information required to determine the appropriate coding module are output from a plurality of output neurons of an output layer when a plurality of characteristic parameters for an analyzing period are input as the input data Ii is constructed in the statistic processing unit 37, and the neural network constructed is arranged in the module selecting unit 18.

In a statistical processing in which the neural network is used, the weighting factors Wji are determined by inputting a large number of sets of characteristic parameters (called a learning). In this embodiment, a learning according to an error inverse propagation method is performed. In detail, the weighting factors Wji which have initial values determined in a random number generator are given to the neural network.

Thereafter, a plurality of characteristic parameters for an analyzing period stored in the coding distortion storing unit 35 are input to the input neurons of the input layer, and a plurality of teaching signals are given to a plurality of the output neurons of the output layer to excite one output neuron corresponding to an appropriate coding module for the analyzing period. For example, when there are five coding modules, five output neurons are prepared in the output layer (j=1 to 5), a teaching signal having a high value of "1" is given to one output neuron corresponding to the appropriate coding module, and four teaching signals respectively having a low value of "0" are given to the other four output neurons. Therefore, the weighting factors Wji are changed to new weighting factors W'ji as follows.

$$W'ji = Wji + \Delta Wji$$

$$\Delta Wji = \alpha * Wji - \mu * \partial\left(\sum_k (T_k - O_k)^2\right) \Big/ \partial Wji$$

Here, $\alpha$ denotes a smoothing factor (constant), $\mu$ denotes an acceleration factor (constant), $\partial$ denotes a partial differential, $T_k$ denotes a value of a teaching signal given to an k-th output neuron, and $O_k$ denotes an output value output from the k-th output neuron.

Thereafter, the new weighting factors W'ji are treated as weighting factors Wji, and the change of the weighting factors Wji is repeated by inputting one after another sets of characteristic parameters for a plurality of analyzing periods. Therefore, values of the weighting factors Wji are converged, and a coding module selecting rule which is composed of the weighting factors Wji converged can be heuristically prepared. The coding module selecting rule is temporarily stored in the selecting rule storing unit 38 and is transmitted to the selecting rule storing unit 16.

In the above configuration of the speech coding apparatus 11, an operation in the apparatus 11 is described.

When a voice or speech is received in the input speech receiving unit 12, the voice or speech is converted into a plurality of digital speech signals, and each of the digital speech signals is processed in the speech analyzing unit 21 to calculate a plurality of characteristic parameters indicating speech characteristics for each of the digital analyzing signals. Thereafter, the characteristic parameters calculated for each of the digital analyzing signals are given to the input neurons of the input layer of the neural network which is constructed in the statistic processing unit 37 and is arranged in the module selecting unit 18. Also, a coding module selecting rule composed of the weighting factors wji is transferred from the selecting rule storing unit 16 to the neural network of the module selecting unit 18. Thereafter, the neural network is operated with the characteristic parameters and the weighting factors Wji obtained in the apparatus 31, only one of the output neurons in the output layer of the neural network is excited. Because the number of the output neuron excited corresponds to the number of the appropriate coding module, the appropriate coding module is selected from the coding modules stored in the coding module storing unit 17. In other words, because a set of characteristic parameters for a digital analyzing signal indicates that the digital analyzing signal corresponds to a particular speech portion such as a silent portion of a voice, an affricate of a voiceless consonant of the voice, a fricative of the voiceless consonant of the voice, a voiced consonant of the voice, a vowel stationary portion of a vowel of the voice or a vowel transitional portion of a vowel of the voice, a coding module corresponding to the particular speech portion is selected as the appropriate coding module.

Thereafter, each of the digital analyzing signals is coded in the appropriate coding module to obtain a coded signal. In this case, each of the coding modules, for example, comprises the adaptive coding book 104, the probabilistic code book 105, the adder 106, the LPC synthesizing unit 107, the comparing unit 108 and the parameter coding unit 109. Thereafter, a series of coded signals for each of the digital speech signals is generated in the coded signal unifying unit 20 and is output to the transmission line 21.

Next, an estimating result for the selection of the appropriate coding module based on the neural network is described with reference to FIGS. 9 and 10.

In this estimation, as shown in FIG. 9, five coding modules operated according to the CELP coding method are arranged in the coding unit 19. A sampling rate for an input speech is 8 kHz, and an analyzing period is 21 mil second. The coding module M1 is appropriate for a vowel transitional portion and a voiced consonant and has a bit rate of 8 kbps, the coding module M2 is appropriate for an affricate of a voiceless consonant, a head portion of a word and a voiced sound at a rear portion of a word and has a bit rate of 8 kbps, the coding module M3 is appropriate for a vowel stationary portion and has a bit rate of 4 kbps, the coding module M4 is appropriate for a fricative of a voiceless consonant and has a bit rate of 4 kbps, and the coding module M5 is appropriate for a silent portion and has a bit rate of 2 kbps.

Also, twenty types of characteristic parameters P1 to P21 are calculated in the speech analyzing unit 21 for each digital analyzing signal and are transmitted to the coding module selecting unit 18. The characteristic parameters P1 to P21 are as follows.

P1: a voice power of a current digital analyzing signal at a current analyzing period P2: a ratio of a voice power of the current digital analyzing signal to a voice power of a previous digital analyzing signal at a previous analyzing period previous to the current analyzing period P3: a ratio of a voice power of the current digital analyzing signal at a head portion of the current analyzing period to that at a rear portion of the current analyzing period P4: a primary auto-correlation coefficient for the current digital analyzing signal P5: a secondary auto-correlation coefficient for the current digital analyzing signal P6: a maximum value of a long-term prediction coefficient for the current digital analyzing signal P7: a ratio of a long-term prediction lag for the current digital analyzing signal to that for the previous digital analyzing signal P8: a voice power of the previous digital analyzing signal P9: a ratio of a voice power of the previous digital analyzing signal at a head portion of the previous analyzing period to that at a rear portion of the previous analyzing period P10: a primary auto-correlation coefficient for the previous digital analyzing signal P11: a secondary auto-correlation coefficient for the previous digital analyzing signal P12: a maximum value of a long-term prediction coefficient for the previous digital analyzing signal P13: a ratio of a long-term prediction lag for the previous digital analyzing signal to that for a second previous digital analyzing signal previous to the previous digital analyzing signal P14: an S/N ratio for the previous digital analyzing signal P15: a voice power of the second previous digital analyzing signal P16: a ratio of a voice power of the second previous digital analyzing signal at a head portion of a second previous analyzing period to that at a rear portion of the second previous analyzing period P17: a primary auto-correlation coefficient for the second previous digital analyzing signal P18: a secondary auto-correlation coefficient for the second previous digital analyzing signal P19: a maximum value of a long-term prediction coefficient for the second previous digital analyzing signal P20: an S/N ratio for the second previous digital analyzing signal A neural network arranged in the coding module selecting unit 18 is composed of twenty input neurons in an input layer, fifteen intermediate neurons in an intermediate layer and five output neurons in an output layer. In this case, to select an appropriate coding module, the multiplication and addition are required 395 times, the calculation of the sigmoid function is required 15 times, and the division into a plurality of cases is required 4 times. A size of a read only memory region required to store the weighting factors Wji is 395 words.

Also, to prepare a coding module selecting rule in the apparatus 31, a plurality of sample short sentences are read by 24 men and women as pieces of learning data to input a plurality of digital sample speech signals in the speech recording unit 32. In this case, the acceleration factor is changed in a range from 0.01 to 0.002 and the smoothing factor is changed in a range from 0.5 to 0.2, so that the weighting factors Wji are rapidly converged. In cases where a recognizing speech to be recognized in the speech coding apparatus 11 is input to the apparatus 11 as pieces of recognizing data equivalent to the learning data, a recognizing result of the speech is shown in FIG. 10. In this case, a recognizing coefficient denoting that a speech portion is correctly recognized is indicated by a probability (%) that the appropriate coding module is correctly selected in the coding module selecting unit 18. For example, in cases where the appropriate coding module is the coding module M1, the recognizing coefficient is 88.6%.

Also, a plurality of short sentences different from the sample short sentences are read by 8 men and women to generate an original speech sound for each of the short sentences. Each of the original speech sounds is coded in the speech coding apparatus 11 to generate a series of coded signals for each of the short sentences. In this case, the weighting factors wji obtained from the sample short sentences are stored in the coding module selecting rule storing unit 18 and are given to the neural network of the coding module selecting unit 18. Thereafter, the series of coded signals are decoded in a decoding apparatus (not shown) to reproduce a synthesized sound for each of the short sentences. Each of the synthesized sounds is subjectively estimated by 19 men and women. That is, each of the men and women gives one of five grades of estimation for each of the synthesized sounds, and a mean opinion score is obtained for the synthesized sounds. In the same manner, a mean opinion score for the original speech sounds and a mean opinion score for conventional synthesized sounds obtained in a conventional speech coding apparatus operated according to the QCELP coding method are obtained. As an estimating result, though the mean opinion score for the original speech sounds is 3.61, the mean opinion score for the conventional synthesized sounds is largely decreased to 3.08. In contrast, the mean opinion score for the synthesized sounds is slightly decreased to 3.38. Therefore, the synthesized sounds having a superior sound quality can be obtained in the speech coding apparatus 11.

Accordngly, because a sample speech is analyzed in the speech analyzing unit 21 to obtain a plurality of characteristic parameters indicating speech characteristics of the sample speech for each analyzing period and because a coding distortion (or an S/N ratio) is obtained from the characteristic parameters in each of the coding modules, an appropriate coding module in which the coding distortion is minimized or the S/N ratio is maximized can be easily specified for each analyzing period.

Also, because the characteristic parameters and the coding distortion are statistically processed in the statistic processing unit 37, a coding module selecting rule can be easily obtained. For example, because the characteristic parameters are given to a plurality of input neurons of a neural network as a set of input data and a plurality of teaching signals are given to a plurality of output neurons of the neural network to excite one of the output neurons corresponding to the appropriate coding module, a plurality of weighting factors Wji specifying a function of the neural network can be easily converged and obtained as a coding module selecting rule.

Also, because a distinguishing speech is analyzed in the speech analyzing unit 21 to obtain a plurality of characteristic parameters indicating speech characteristics of the distinguishing speech for each analyzing period and because an appropriate coding module is selected from a plurality of coding modules in the coding module selecting unit 18 by inputting the characteristic parameters to the input neurons of the neural network in which the weighting factors Wji denoting the coding module selecting rule are set and specifying an excited output neuron corresponding to the appropriate coding module, the selection of the appropriate coding module can be easily performed at a low calculation volume.

Also, because the characteristic parameters or the coding distortion can be improved by an operator in the data improving unit 36 before the statistic processing performed in the statistic processing unit 37, the coding module selecting rule which reflects an operator's will can be obtained. Therefore, a speech can be efficiently coded in the speech coding apparatus 11 while reflecting the operator's will.

Next, a second embodiment of the present invention is described to achieve the first object of the present invention.

Figures 10, 11:
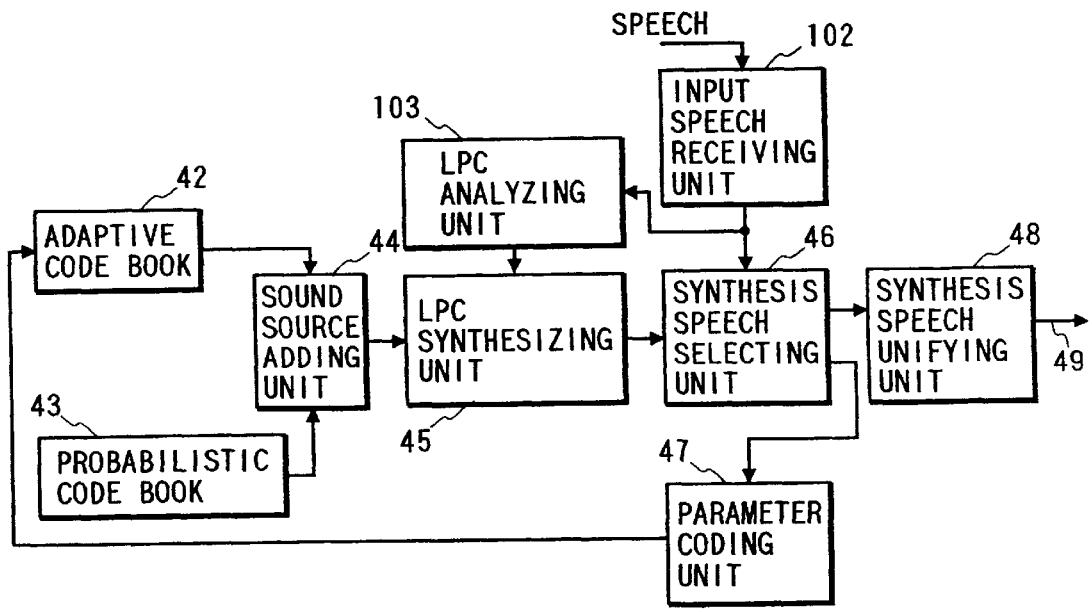
FIG. 10 shows a probability that an appropriate coding module is correctly selected in the coding module selecting unit.
FIG. 11 is a block diagram of a speech coding apparatus according to a second embodiment of the present invention.

FIG. 11 is a block diagram of a speech coding apparatus according to a second embodiment of the present invention.

As shown in FIG. 11, a speech coding apparatus 41 comprises:

the input speech receiving unit 102 for receiving an input speech or voice and generating pieces of speech data;

the LPC analyzing unit 103 for performing an auto-correlation analysis and a linear prediction coefficient analysis to obtain a linear prediction coefficient for each of the speech data;

an adaptive code book 42 for storing a plurality of past synthesis sound sources (or past synthesis code vectors);

a probabilistic code book 43 for storing a plurality of fixed sound sources (or fixed code vectors);

a sound source adding unit 44 for taking out each of the past synthesis sound sources from the adaptive code book 42 as a candidate for an appropriate past synthesis sound source, calculating an optimum gain for the candidate, reading out each of the fixed sound sources in a normal direction from the probabilistic code book 43 as a candidate for an appropriate fixed sound source, calculating an optimum gain for the candidate, reading out each of the fixed sound sources in a reverse direction opposite to the normal direction from the probabilistic code book 43 to obtain a reverse fixed sound source as another candidate for the appropriate fixed sound source, calculating an optimum gain for the candidate, adding each of the past synthesis sound sources and each of the fixed sound sources power-adjusted with the optimum gains to generate a first synthesis sound source, and adding each of the past synthesis sound sources and each of the reverse fixed sound sources power-adjusted with the optimum gains to generate a second synthesis sound source;

an LPC synthesizing unit 45 for filtering each of the first synthesis sound sources and each of the second synthesis sound sources obtained in the sound source adding unit 44 with the reproduced linear prediction coefficient obtained in the LPC analyzing unit 103 to generate a first synthesis speech and a second synthesis speech;

a synthesis speech selecting unit 46 for calculating a distance between a corresponding piece of speech data received in the input speech receiving unit 102 and each of the first and second synthesis speeches for each of the speech data, selecting a particular synthesis speech, which corresponds to a particular distance having a minimum value among those of the distances, from among the first and second synthesis speeches for each of the speech data, selecting a particular past synthesis sound source corresponding to the particular synthesis speech from among the past synthesis sound sources as the appropriate past synthesis sound source and selecting a particular fixed sound source corresponding to the particular synthesis speech from among the fixed sound sources as the appropriate fixed sound source;

a parameter coding unit 47 for coding the appropriate gains of the appropriate past synthesis sound source and the appropriate fixed sound source to obtain two gain codes, generating a particular synthesis sound source from the gain codes and the appropriate past synthesis and fixed sound sources for each of the speech data, and transmitting the particular synthesis sound source to the adaptive code book 42 to replace the particular past sound source with the particular synthesis sound source;

a synthesis speech unifying unit 48 for unifying the particular synthesis speeches selected in the synthesis speech selecting unit 46 to a series of synthesis speeches corresponding to a coded speech, and transmitting the series of synthesis speeches to a transmission line 49 to reproduce the speech in a reproducing apparatus (not shown).

In the LPC synthesizing unit 45, acoustic feeling for the speech data is weighted with the linear prediction coefficient, a frequency emphasizing filter coefficient and a long-term prediction coefficient obtained by performing a long-term prediction analysis for the speech data. Also, the past and fixed sound sources are taken out from sub-frames obtained by dividing each of analyzing blocks in the adaptive code book 42 and the probabilistic code book 43.

In the above configuration, an operation in the speech coding apparatus 41 is described.

When a speech is received by the receiving unit 102, a reproduced linear prediction coefficient is generated in the LPC analyzing unit 103 and is sent to the LPC synthesizing unit 45, and a piece of speech data is sent to the synthesis speech selecting unit 46. Also, each of the past synthesis sound sources is taken out from the adaptive code book 42 to the sound source adding unit 44 as a candidate for an appropriate past synthesis sound source.

Figure 12:
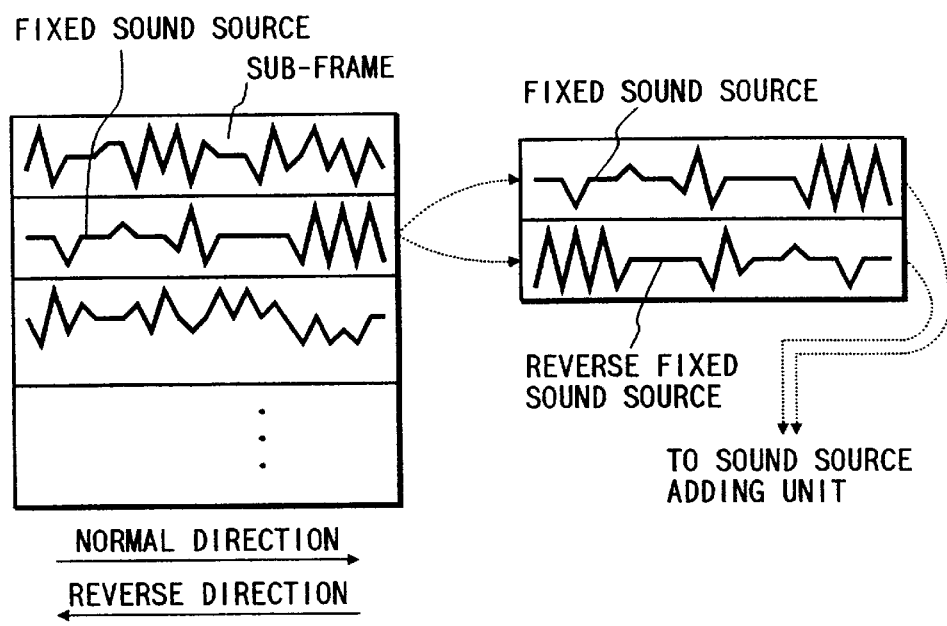
FIG. 12 shows a fixed sound source obtained by reading out the fixed sound source in a normal direction from a sub-frame of a probabilistic code book of the speech coding apparatus shown in FIG. 11 and a reverse fixed sound source obtained by reading out the fixed sound source in a reverse direction from the sub-frame of the probabilistic code book.

Also, as shown in FIG. 12, each of the fixed sound sources stored in the probabilistic code book 43 is read out in a normal direction and is sent to the unit 44 as a candidate for an appropriate fixed sound source, each of the fixed sound sources stored in the unit 43 is read out in a reverse direction to generate a reverse fixed sound source, and each of the reverse fixed sound sources is sent to the unit 44 as another candidate for the appropriate fixed sound source. That is, when a sampling pointer for pointing a fixed sound source is moved in the normal direction, the fixed sound source is sent to the unit 44. Also, when the sampling pointer is moved in the reverse direction, the reverse fixed sound source is sent to the unit 44. Therefore, two sound sources are generated from one fixed sound source as two candidates for the appropriate fixed sound source.

Thereafter, a synthesis sound source is generated from each of the candidates for the appropriate past sound source and each of the candidates for the appropriate fixed sound source in the unit 44, a synthesis speech is generated from each of the synthesis sound sources according to the reproduced linear prediction coefficient in the LPC synthesizing unit 45 for each of the speech data. Thereafter, a distance between a piece of corresponding speech data and each of the first and second synthesis speeches is calculated, a particular synthesis speech appropriate to the corresponding speech data is selected from the synthesis speeches in the synthesis speech selecting unit 46 for each of the speech data.

Thereafter, the particular synthesis speeches for the speech data are unified to a series of particular synthesis speeches indicating a coded speech in the synthesis speech unifying unit 48, and the series of particular synthesis speeches is transmitted to the transmission line 49 to reproduce the speech.

Also, the appropriate past synthesis sound source and the appropriate fixed sound source corresponding to the particular synthesis speech are selected from among the past synthesis sound sources and the fixed sound sources in the unit 46 for each of the speech data, two gain codes are generated from the appropriate gains for the appropriate past synthesis sound source and the appropriate fixed sound source, and a particular synthesis sound source is generated from the gain codes and the appropriate past synthesis and fixed sound sources in the parameter coding unit 47 for each of the speech data. The appropriate past synthesis sound source stored in the adaptive coding book 42 is replaced with the particular synthesis sound source.

Accordingly, because two sound sources are generated from one fixed sound source, the number of fixed sound sources used as candidates for the appropriate fixed sound source can be substantially increased two times as large as the number of fixed sound sources stored in the probabilistic code book 43. Therefore, a size of the probabilistic code book 43 can be reduced to half of that of the probabilistic code book 105 on condition that a reproduced speech does not deteriorate.

Also, because two sound sources are generated from one fixed sound source by moving the sampling pointer in two directions opposite to each other, a size of the probabilistic code book 43 can be reduced to half without any increase of calculation volume.

Next, a sound source improving apparatus in which each of the fixed sound sources is improved to an ideal fixed sound source is described.

In cases where a fixed sound source is symmetrical, a quality of reproduced speech deteriorates by using a reverse fixed sound source reverse to the symmetrical fixed sound source. Also, in cases where a reverse fixed sound source corresponding to a fixed sound source is similar to another fixed sound source, a quality of reproduced speech deteriorates by using the reverse fixed sound source. Therefore, in cases where each of the fixed sound sources is not symmetrical and each of the reverse fixed sound sources is not similar to any fixed sound source, a quality of a reproduced speech can be improved.

Figure 13:
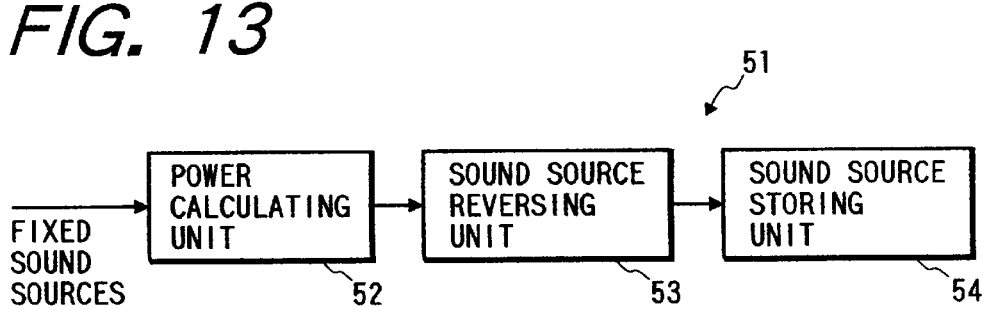
FIG. 13 is a block diagram of a sound source improving apparatus according to the second embodiment.

FIG. 13 is a block diagram of a sound source improving apparatus according to the second embodiment.

As shown in FIG. 13, a sound source improving apparatus 51 comprises a power calculating unit 52 for calculating a front voice power at a front portion of each of the fixed sound sources and calculating a rear voice power at a rear portion of each of the fixed sound sources, a sound source reversing unit 53 for rearranging each of fixed sound sources, in which the rear voice power is higher than the front voice power, in a sub-frame in reverse to generate an ideal sound source in which the front voice power is equal to or higher than the rear voice power, and a sound source storing unit 54 for storing the ideal sound sources generated in the sound source reversing unit 53 and storing a plurality of fixed sound sources not rearranged in reverse by the unit 53 as ideal sound sources.

In the above configuration, the fixed sound sources function as code vectors. Each of fixed sound sources, in which the rear voice power is higher than the front voice power, is rearranged in reverse, and each of the other fixed sound sources, in which the front voice power is equal to or higher than the rear voice power, is not rearranged. Therefore, the front voice power becomes equal to or higher than the rear voice power in each of all fixed sound sources. That is, a centroid group of fixed sound sources is formed. The fixed sound sources stored in the probabilistic code book 105 are replaced with the ideal sound sources stored in the sound source storing unit 54.

An rearrangement technique for a population of vectors according to an LBG algorithm is disclosed in a literature "IEEE Transactions on Communications", Vol. COM-28, No.1, January 1980.

Accordingly, because the front voice power becomes equal to or higher than the rear voice power in each of all fixed sound sources, each of the fixed sound sources is not symmetrical and each of the reverse fixed sound sources is not similar to any fixed sound source. Therefore, a quality of a reproduced speech can be reliably improved.

Also, another sound source improving apparatus in which each of the fixed sound sources is improved to an ideal fixed sound source according to a learning method is described.

Figure 14:
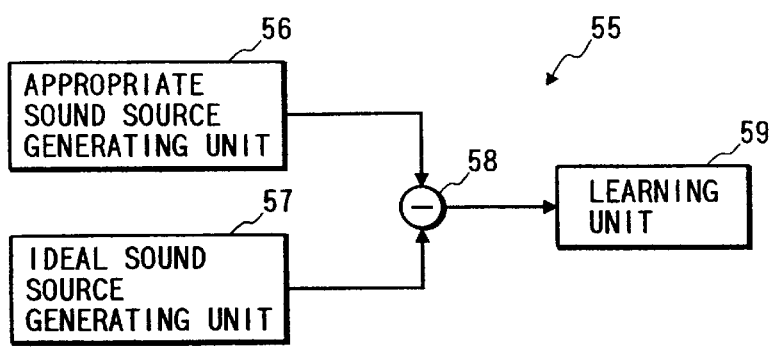
FIG. 14 is a block diagram of another sound source improving apparatus according to the second embodiment.

FIG. 14 is a block diagram of another sound source improving apparatus according to the second embodiment.

As shown in FIG. 14, a sound source improving apparatus 55 comprises an appropriate sound source generating unit 56 for instructing the sound source adding unit 44, the LPC synthesizing unit 45 and the synthesis speech selecting unit 46 to select an appropriate past sound source read out from the adaptive code book 42 and an appropriate fixed sound source read out from the probabilistic code book 43 for each of pieces of input speech data, an ideal sound source generating unit 57 for generating an ideal sound source from each of the input speech data by inverse-filtering each of the input speech data with a reverse linear prediction coefficient reverse to the linear prediction coefficient generated in the LPC analyzing unit 103, a subtracter 58 for subtracting each of the appropriate past sound sources of the adaptive code book 42 from each of the ideal sound sources to generate an ideal probabilistic code book sound source for each of the input speech data, and a learning unit 59 for generating an ideal sound source of the probabilistic code book 43 for each of the input speech data from each of the ideal probabilistic code book sound sources by converging the ideal sound source according to a learning method.

The learning method is performed according to a following equation.

$$Cji(n)=Cji(n-1)*(1-p)+Di/gi*p$$

Here, Cji (n) denotes a vector of the ideal sound source obtained in an n-th converging stage, i denotes the numbers of the pieces of speech data input as pieces of sampling data (i=1 to L), L denotes a length of the vector of the ideal sound source, j denotes the numbers of the appropriate fixed sound sources selected for the speech data, Di denotes the ideal probabilistic code book sound sources, $g_i$ denotes the appropriate gains for the appropriate fixed sound sources, and $\mu$ denotes a learning factor ($0<\mu<1$).

In the above configuration, each of the ideal sound sources of the probabilistic code book 43 is converged in the learning unit 59 by gradually decreasing the learning factor $\mu$ to zero. Thereafter, the fixed sound sources stored in the probabilistic code book 105 are replaced with the ideal sound sources.

Accordingly, because the ideal sound sources are generated while adapting the ideal sound sources to the input speech data and the fixed sound sources stored in the probabilistic code book 105 are replaced with the ideal sound sources, a quality of a reproduced speech can be reliably improved.

Next, a linear prediction coefficient analyzing apparatus utilized to obtain a linear prediction coefficient for each of speech signals in a speech coding apparatus is described according to a third embodiment of the present invention to solve the third object.

Figure 15:
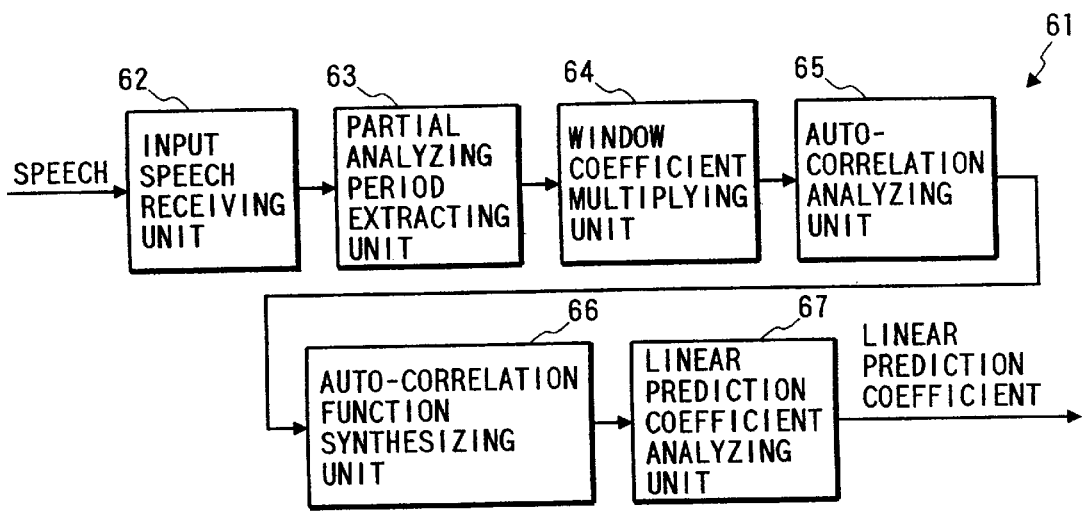
FIG. 15 is a block diagram of a linear prediction coefficient analyzing apparatus according to a third embodiment of the present invention.

FIG. 15 is a block diagram of a linear prediction coefficient analyzing apparatus according to a third embodiment of the present invention.

As shown in FIG. 15, a linear prediction coefficient analyzing apparatus 61 comprises:

an input speech receiving unit 62 for receiving a speech and converting the speech into a plurality of speech signals divided at analyzing periods;

a partial analyzing period extracting unit 63 for extracting a plurality of partial analyzing periods having various time-lengths from each of the analyzing periods on condition that it is allowed that the partial analyzing periods are overlapped with each other, a plurality of partial speech signals corresponding to the partial analyzing periods being extracted from each of the speech signals;

a window coefficient multiplying unit 64 for multiplying each of the partial speech signals by a window coefficient to generate a window-processed partial speech signal for each of the partial analyzing periods;

an auto-correlation analyzing unit 65 for analyzing an auto-correlation of each of the window-processed partial speech signals to generate an auto-correlation function for each of the partial analyzing periods;

an auto-correlation function synthesizing unit 66 for weighting each of the auto-correlation functions with a weighting factor to generate a weighted auto-correlation function for each of the partial analyzing periods and adding the weighted auto-correlation functions each other to generate a synthesized auto-correlation function for each of the analyzing periods; and a linear prediction coefficient analyzing unit 67 for performing a linear prediction analysis for the synthesized auto-correlation function according to an auto-correlation method for each of the speech signals.

It is applicable that the partial analyzing periods extracted by the partial analyzing period extracting unit 63 are overlapped with each other. A coefficient in a Hamming window, a Hanning window, a Blackman-Harris window or the like is used as the window coefficient. The linear prediction analysis performed by the linear prediction coefficient analyzing unit 67 is disclosed in various speech information processing documents such as "The Autocorrelation Method" in the literature written by L. R. Labiner and R. W. Schafer "Digital Processing of Speech Signals" pp.401–403.

Figure 16:
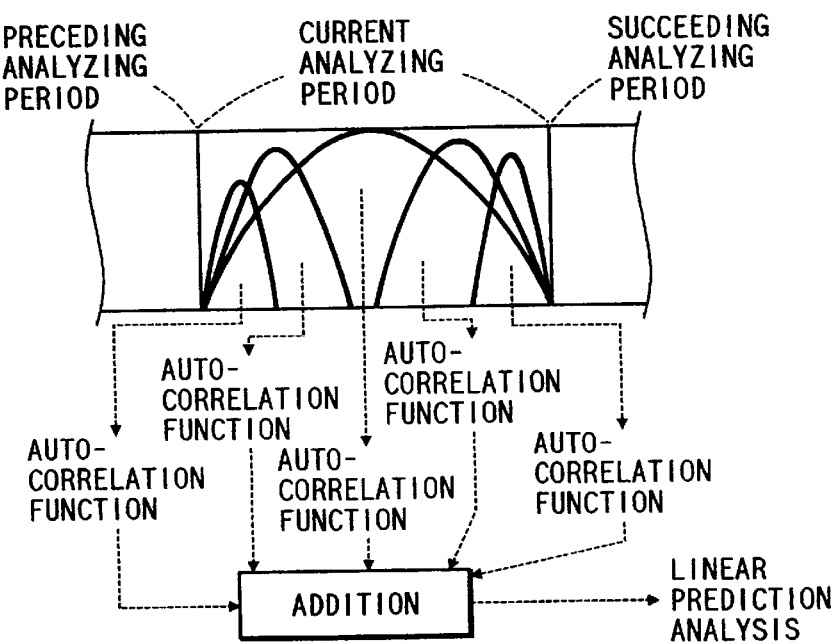
FIG. 16 shows an addition of a plurality of auto-correlation functions which each are obtained at a partial analyzing period at which a partial speech signal is multiplied by a window coefficient.

In the above configuration, when a speech is input to the receiving unit 62, a plurality of speech signals having analyzing periods are generated in time series. Thereafter, a plurality of partial analyzing periods having various time-lengths are extracted from each of the analyzing periods in the extracting unit 63, and a plurality of partial speech signals $PX_{i,k}$ corresponding to the partial analyzing periods are extracted from each of the speech signals $X_i$. In this case, as shown in FIG. 16, it is allowed that the partial analyzing periods are overlapped with each other. Thereafter, each of the partial speech signals $PX_{i,k}$ is multiplied by a window coefficient $H_{i,k}$ to generate a window-processed partial speech signal $PY_{i,k}$ for each of the partial analyzing periods in the multiplying unit 64.

$$PY_{i,k} = H_{i,k} * PX_{i,k}$$

Here, k denotes the numbers of the partial speech signals of a current speech signal in a current analyzing period (k=1 to Kmax), and i denotes the number of the current speech signal among the speech signals (i=1 to Imax).

Thereafter, an auto-correlation of each of the window-processed partial speech signals $PY_{i,k}$ is analyzed in the analyzing unit 65 to generate an auto-correlation function $PV_{i,j}$ for each of the partial analyzing periods.

$$PV_{i,j} = \sum_{k=j+1}^{Kmax} \{PY_{i,k} * PY_{i,(k-j)}\}$$

Here, j denotes the numbers of the auto-correlation functions in the current analyzing period (j=1 to Jmax), Thereafter, in the synthesizing unit 66, each of the auto-correlation functions $PV_{i,j}$ is weighted with a weighting factor $W_j$ to generate a weighted auto-correlation function for each of the partial analyzing periods and adding the weighted auto-correlation functions each other to generate a synthesized auto-correlation function $U_i$ for each of the analyzing periods.

$$U_i = \sum_{j}^{Jmax} (W_j * PV_{i,j})$$

Thereafter, a linear prediction analysis is performed for the synthesized auto-correlation function $U_i$ according to an auto-correlation method for each of the speech signals in the analyzing unit 67.

Accordingly, because any succeeding speech signal is not multiplied by a window coefficient for the current speech signal, any coding process delay does not occurs to code each of the speech signals.

Also, because each of the speech signals is multiplied by a plurality of window coefficients, a piece of information about the entire speech signal can be reliably reflected on a piece of information for a corresponding window-processed speech signal without any coding process delay.

Next, a determining method of values of the weighting factors is described.

Values of the weighting factors for the auto-correlation functions in an analyzing period depends on characteristics of a speech signal at the analyzing period. For example, in cases where it is required to emphasize a rear portion of a speech signal at an analyzing period, a partial analyzing period placed at a rear portion of the analyzing period is extracted in the extracting unit 63 to have a short time-length, an auto-correlation function for the partial analyzing period is generated in the analyzing unit 65, and the auto-correlation function is weighted by a weighting factor having a high value in the synthesizing unit 66.

Accordingly, because a speech signal can be locally emphasize in each of the analyzing periods by using a weighting factor having a high value, a linear prediction coefficient reflecting a piece of information in which the speech signal is locally emphasized can be obtained.

Also, in cases where a linear prediction coefficient representing an entire speech signal is required for each of the analyzing periods, values of a plurality of weighting factors for a plurality of partial speech signals at each of the analyzing periods are set in the synthesizing unit 66 to uniformly weight the speech signal at each of the analyzing periods. In detail, a sum of window coefficients for the partial speech signals of each speech signal is set to a value close to one. That is, values of the weighting factors $W_j$ are determined to minimize an error E as follows.

$$E = \sum_{i}^{lmax} \left\{ 1 - \sum_{j}^{Jmax} (Wj * Hi, j) \right\}^2$$

To determine the values of the weighting factors according to the above equation, a plurality of simultaneous equations obtained by partially differentiating the error E with respect to each of the weighting factors are solved. The simultaneous equations which each correspond to one of the k values are expressed as follows.

$$\sum_{i}^{lmax} Hi, k = \sum_{j}^{Jmax} Wj \sum_{i}^{lmax} (Hi, j * Hi, k)$$

Here; k denotes the numbers of the partial speech signals of a current speech signal in a current analyzing period (k=1 to Kmax).

Next, an estimating result of coding and decoding operations performed for the speech signals obtained in the receiving unit 62 is described. Estimating conditions are as follows. A sampling rate for the speech in the receiving unit 62 is 8 kHz. That is, the speech signals are generated at the sampling rate. Each of the analyzing periods is partitioned into 256 sampling periods. A first Hamming window having a first time length equivalent to 32 sampling periods is set for a partial speech signal at a partial analyzing period ranging from a first sampling period to a 32-th sampling period and another partial speech signal at a partial analyzing period ranging from a 225-th sampling period to a 256-th sampling period. A second Hamming window having a second time length equivalent to 64 sampling periods is set for a partial speech signal ranging from a first sampling period to a 64-th sampling period and another partial speech signal ranging from a 193-th sampling period to a 256-th sampling period. A third Hamming window having a third time length equivalent to 128 sampling periods is set for a partial speech signal ranging from a first sampling period to a 128-th sampling period and another partial speech signal ranging from a 129-th sampling period to a 256-th sampling period. A fourth Hamming window having a fourth time length equivalent to 256 sampling periods is set for a partial speech signal ranging from a first sampling period to a 256-th sampling period. A sum of window coefficients for the sampling periods of each speech signal is set to a value close to one.

A linear prediction coefficient is obtained for each of the speech signals generated in the receiving unit 62 according to the above estimating conditions in the apparatus 61, coded speech signals are obtained by using the linear prediction coefficients obtained according to the third embodiment, and the coded speech signals are decoded in a decoding apparatus to obtain a reproduced speech.

Though an allophone locally occurs in a reproduced speech in cases where a linear prediction coefficient for each of the speech signals is obtained in a conventional apparatus, the local allophone is greatly reduced in cases where a linear prediction coefficient for each of the speech signals is obtained according to the above estimating conditions in the linear prediction coefficient analyzing apparatus 61. That is a quality of the reproduced speech is greatly improved in the third embodiment.

Next, a noise reducing apparatus in which a noise included in an analyzing period for a speech which is coded in a speech coding apparatus or included in another analyzing period for a non-speech is reduced is described according to a fourth embodiment of the present invention to solve the fourth object.

Figure 17:
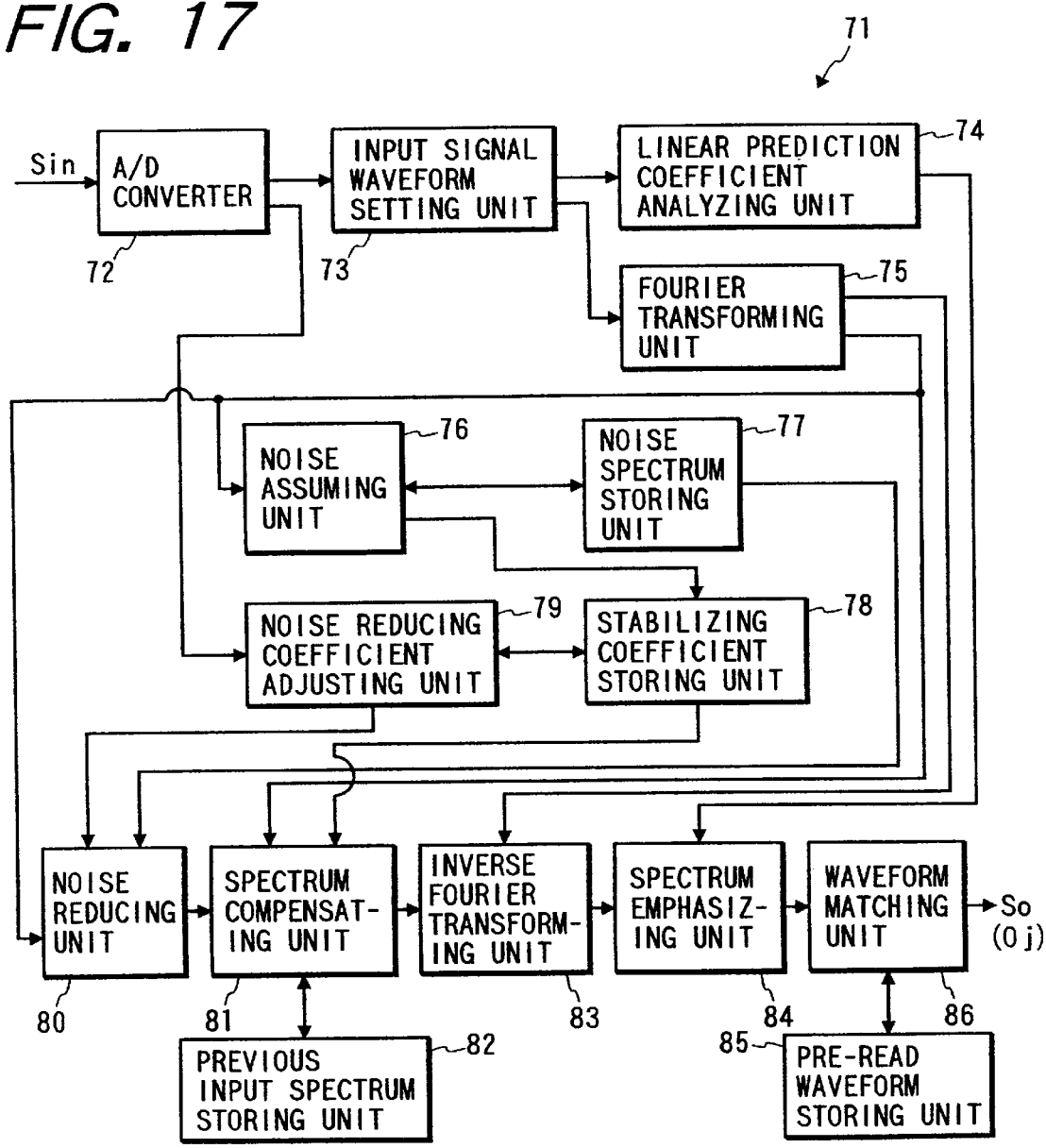
FIG. 17 is a block diagram of a noise reducing apparatus according to a fourth embodiment of the present invention.

FIG. 17 is a block diagram of a noise reducing apparatus according to a fourth embodiment of the present invention.

As shown in FIG. 17, a noise reducing apparatus 71 comprises;

an analog-digital (A/D) converter 72 for converting a plurality of frames of analog input speech signals Sin into a plurality of frames of digital input signals, a speech and a noise being included in the frames;

an input signal waveform setting unit 73 for setting waveforms of the frames of digital input signals obtained in the converter 72 in a memory one after another;

a linear prediction coefficient analyzing unit 74 for performing a linear prediction coefficient analysis for each of the waveforms of the frames of digital input signals set in the input signal waveform setting unit 73 to obtain a linear prediction coefficient for each frame of digital input signals;

a Fourier transforming unit 75 for transforming each of the waveforms of the frames of digital input signals set in the input signal waveform setting unit 73 and obtaining an input spectrum and a phase spectrum corresponding to each frame of digital input signals for each of frequency values;

a noise assuming unit 76 for assuming a first noise spectrum and a second noise spectrum for each frequency value according to a current input spectrum and one or more past input spectra obtained from the current and past frames of digital input signals in the Fourier transforming unit 75;

a noise spectrum storing unit 77 for storing the first and second noise spectra assumed in the noise assuming unit 76 for each frequency value;

a stabilizing coefficient storing unit 78 for storing a stabilizing coefficient corresponding to each frame of digital input signals, the stabilizing coefficient indicating a higher stability of the first noise spectrum assumed by the noise assuming unit 76 as a value of the stabilizing coefficient becomes low, and the stabilizing coefficient being compulsorily set to a high value by the noise assuming unit 76 in cases where a noise power obtained by adding the first noise spectra for all frequency values together indicates that any noise does not exist in the current and past frames;

a noise reducing coefficient adjusting unit 79 for adjusting a noise reducing coefficient used for controlling a reducing degree for a noise at each frame of digital input signals according to the stabilizing coefficient stored in the stabilizing coefficient storing unit 78 and gradually reducing the stabilizing coefficient stored in the storing unit 78 each time a frame of digital input signals is obtained in the A/D converter 72;

a noise reducing unit 80 for reducing the noise included in each frame of digital input signals according to the noise reducing coefficient adjusted in the noise reducing coefficient adjusting unit 79 for each frequency value by subtracting the noise spectrum stored in the noise spectrum storing unit 77 from each input spectrum obtained in the Fourier transforming unit 75 and outputting a noise-reduced input spectrum corresponding to each frame for each frequency value;

a spectrum compensating unit 81 for compensating each of the noise-reduced input spectra output from the reducing unit 80 for an excessive subtraction of the noise spectrum and outputting an output spectrum corresponding to each frame for each frequency value;

a previous input spectrum storing unit 82 for storing each of the output spectra output from the spectrum compensating unit 81 as a previous input spectrum for each frequency value, the compensation in the compensating unit 81 being performed by using the previous input spectrum for each frequency value;

an inverse Fourier transforming unit 83 for performing an inverse Fourier transformation for each of the output spectra transmitted from the spectrum compensating unit 81 according to the phase spectrum obtained for each frame of digital input signals in the Fourier transforming unit 75 and obtaining a group of first-order output signals for each frame of digital input signals;

a spectrum emphasizing unit 84 for emphasizing a spectrum of each group of first-order output signals obtained in the inverse Fourier transforming unit 83 by performing a very emphasizing filter processing, a high frequency emphasizing filter processing and a power emphasizing filter processing for each group of first-order output signals according to the linear prediction coefficient obtained for each frame of digital input signals in the linear prediction coefficient analyzing unit 74 and obtaining a group of second-order output signals for each frame of digital input signals;

a pre-read waveform storing unit 85 for storing a head portion of a current frame of second-order output signals emphasized by the spectrum emphasizing unit 84; and a waveform matching unit 86 for receiving a current frame of second-order output signals and a head portion of a succeeding frame of second-order output signals emphasized in the spectrum emphasizing unit 84, deforming a waveform of the current frame received according to the head portion of the current frame stored in the pre-read waveform storing unit 85 to match the waveform of the current frame to that of a preceding frame preceding the current frame, outputting a matched frame of second-order output signals as a current frame of output signals So for each frame of digital input signals, and transmitting the head portion of the succeeding frame to the storing unit 85 to replace the head portion of the current frame with the head portion of the succeeding frame.

In the above configuration, an operation of the noise reducing apparatus 71 is described in brief.

A plurality of frames of analog input speech signals Sin are converted into a plurality of frames of digital input signals in the A/D converter 72 one after another, and waveforms of the frames of digital input signals are set in a memory of the setting unit 73. Also, a stabilizing coefficient indicating the stability of a noise assumption is set to an initial value and is stored in the stabilizing coefficient storing unit 78. In the adjusting unit 79, a noise reducing coefficient is adjusted according to the stabilizing coefficient, and the stabilizing coefficient is gradually reduced each time a frame of digital input signals is obtained in the A/D converter 72. 10 A linear prediction coefficient is generated in the analyzing unit 74 for each frame of digital input signals set in the setting unit 73, and a Fourier transformation is performed for each frame of digital input signals in the transforming unit 75 to generate an input spectrum and a phase spectra corresponding to each frame of digital input signals for each frequency value. Thereafter, a noise spectrum included in a current or one or more past frames of input spectra is assumed in the assuming unit 76 and is stored in the noise spectrum storing unit 77 for each frequency value. In cases where it is judged by the noise assuming unit 76 that any noise does not exist in the current or the past frames according to the noise spectra for all frequency values, the stabilizing coefficient stored in the stabilizing coefficient storing unit 78 is compulsorily set to a high value because the noise spectra assumed are very unstable. Thereafter, each of the noise spectra stored in the storing unit 77 is subtracted from a current input spectrum at the current frame of digital input signals according to the noise reducing coefficient stored in the adjusting unit 79, and a plurality of noise-reduced spectra at the current frame for all frequency values are output. That is, a noise included in each frame of digital input signals is reduced according to the noise reducing coefficient. In this case, there is a probability that an intensity of a noise-reduced input spectrum is reduced to a negative value. Therefore, in cases where the intensity of the noise-reduced input spectrum is reduced to a negative value, the noise-reduced input spectrum is compensated in the compensating unit 81 according to the previous input spectrum stored in the storing unit 82. Thereafter, an inverse Fourier transformation is performed for each of the output spectra obtained in the compensating unit 81 according to each of the phase spectra. Therefore, a plurality of groups of first-order output signals are obtained one after another. Each group of first-order output signals is composed of a frame of first-order output signals and a head portion of a succeeding frame of first-order output signals. Thereafter, a spectrum of each group of first-order output signals is emphasized in the emphasizing unit 84 according to the linear prediction coefficient obtained for each frame of digital input signals in the linear prediction coefficient analyzing unit 74. Thereafter, a waveform of a current frame of second-order output signals obtained in the emphasizing unit 84 is matched to that of a preceding frame of second-order output signals in the matching unit 86, and the current frame of second-order output signals is output as a current frame of output signals So.

Next, an algorithm in the apparatus 71 is described in detail. Names of various fixed parameters and setting examples are initially listed in Table 1.

TABLE 1

| Fixed parameters | Setting examples |
| --- | --- |
| Frame length of a current frame of input signals | 160 points equivalent to 20 mil seconds for the current frame sampled at 8 kHz |
| Length of a head portion of a succeeding frame read with the current frame | 60 points equivalent to 7.5 mil seconds for the succeeding frame sampled at 8 kHz |
| Designated noise reducing coefficient | 20.0 |
| Prediction order of linear prediction coefficient | 10 |
| The reference continuation number of noise spectra | 100 |
| Designated minimum sound power | 10.0 |
| Moving Average (MA) emphasizing coefficient | 0.6 |
| Auto-regressive (AR) emphasizing coefficient | 0.7 |
| High frequency emphasizing coefficient | 0.3 |

TABLE 1-continued

| Fixed parameters | Setting examples |
|---|---|
| Sound power emphasizing coefficient | 1.2 |
| Reference noise power | 2700.0 |

After the fixed parameters are set, static RAM regions of the stabilizing coefficient storing unit 78, the noise spectrum storing unit 77, the previous spectrum storing unit 82 and the pre-read waveform storing unit 85 are cleared and set to initial values. That is, because the stabilizing coefficient indicates the stability for the assumption of a noise included in an input signal, a stabilizing coefficient of a value 2.0 is initially set in the stabilizing coefficient storing unit 78. The smaller the value of the stabilizing coefficient, the more stable the noise assumption in the noise assuming unit 76. The noise spectrum storing unit 77 has an area for storing a first noise spectrum as a first-place candidate for each frequency value, a second noise spectrum as a second-place candidate for each frequency value, the number of frames (called first continuation number) in which the first noise spectrum is maintained to have a minimum value among values of input spectra in the frames and the number of frames (called second continuation number) in which the second noise spectrum is maintained to have a second minimum value among values of input spectra in the frames. Therefore, sufficiently high values are initially stored in the unit 77 as values of the first and second noise spectra and the reference continuation number for the first and second continuation numbers. The previous spectrum storing unit 82 has an area for storing a preceding input spectrum for a preceding frame and a preceding sound power for the preceding frame. Therefore, a designated minimum sound power is initially stored in the unit 82 for each of frequency values, and a zero value is initially stored in the unit 82 as the preceding sound power. The pre-read waveform storing unit 85 has an area for storing a head portion of a succeeding frame read with a current frame (or a head portion of a current frame read with a preceding frame) to match the current frame of noise-reduced input signals to the preceding frame of noise-reduced input signals. Therefore, a zero value is initially stored in the unit 85.

Next, a noise reducing algorithm in the apparatus 71 is described.

A current frame of analog input signals and a portion of a succeeding frame of analog input signals are converted into a current frame of digital input signals (160 points) and a portion of a succeeding frame of digital input signals (60 points) in the A/D converter 72. Thereafter, a noise reducing coefficient Q is calculated in the adjusting unit 79 according to a stabilizing coefficient C stored in the unit 78 and the designated noise reducing coefficient P as follows.

$C=C*0.8$ $Q=P*(1.0-C)$ (in case of $C \leq 1.0$)

$Q=1.0$ (in case of $1.0<C<2.0$)

$Q=0.0$ (in case of $2.0<C$)

A renewed stabilizing coefficient C' is stored in the storing unit 78 as a stabilizing coefficient C. That is, the stabilizing coefficient C is gradually reduced each time a frame of digital input signals is obtained in the A/D converter 72 because the stability of a noise assumption performed in the noise assuming unit 76 is heightened.

In the setting unit 73, the digital input signals obtained in the A/D converted 72 are written in a rear portion of a first memory having a data point length of $2^n$ (n is a natural number), and a head portion of the first memory is filled with a series of "0" digital values. That is, "0" digital values are written in the head portion ranging from 0 to 35 positions, and the digital input signals are written in the rear portion ranging from 36 to 255 positions to form a first data arrangement in the first memory. This first data arrangement is used as a real component in an eight-order fast Fourier transformation performed in the transforming unit 75. Also, a second data arrangement composed of "0" digital values is initially formed in a second memory having the same data point length of $2^n$. The second data arrangement is used as an imaginary component in the eight-order fast Fourier transformation.

In the linear prediction coefficient analyzing unit 74, a Humming window is put on the first data arrangement. That is, the digital input signals set in the first memory of the unit 73 are multiplied by a window coefficient to produce a plurality of digital window-processed signals, an autocorrelation analysis is performed for the digital window-processed signals to produce a plurality of autocorrelation coefficients, a linear prediction coefficient analysis based on an autocorrelation method is performed for the autocorrelation coefficients, and a linear prediction efficient $\alpha_i$ is obtained. Thereafter, an MA coefficient a(MA)i and an AR coefficient $\alpha(AR)_i$ of a very emphasis filter used in the emphasizing unit 84 are calculated according to the linear prediction coefficient $\alpha_i$, an MA emphasizing coefficient $\beta$ predetermined, an AR emphasizing coefficient $\gamma$ predetermined.

$\alpha(MA)_i = \alpha_i * \beta^i$ $\alpha(AR)_i = \alpha_i * \gamma^i$

Here, i denotes a degree.

In the Fourier transforming unit 75, a discrete Fourier transformation is performed for the first data arrangement formed as a real component and the second data arrangement formed as an imaginary component in the setting unit 73 to obtain a real component and an imaginary component of a complex spectrum expressed by a complex vector for each frequency value, and a first absolute value of the real component and a second absolute value of the imaginary component are added to each other. Therefore, because a process that a square root of a squared absolute value obtained by adding the real component squared and the imaginary component squared each other is calculated to obtain an amplitude spectrum having a value of the square root for each frequency value is not performed, a pseudo-amplitude spectrum (hereinafter, called an input spectrum) having a value of the sum of the first absolute value and the second absolute value is obtained for each frequency value. Also, a sum of the input spectra for all frequency values is obtained as an input sound power for each frame.

Therefore, because the calculation for obtaining a square root of a squared absolute value can be omitted, a calculation volume required to obtain the input spectra can be considerably reduced.

Next, the processing in the noise assuming unit 76 is described.

Because noise steadily exists in each frame of analog input speech signals Sin as a background, the noise always has a minimum intensity among those of the analog input speech signals Sin. Therefore, in this embodiment, first and second noise spectra representing the noise is determined as follows. A first noise spectrum stored in the noise spectrum storing unit 77 as a first-place candidate for each frequency value is defined as an input spectrum having a minimum value among values of input spectra in a current frame and one or more past frames the number of which equals to a first continuation number. That is, the minimum value $N_{i,t}$ of the first noise spectrum is formulated as follows.

$$N_{i,t}=\min \{S_{i,p}\} \ (p=t \text{ to } t-T)$$

Here, i denotes the numbers of the frequency values, t denotes a current frame, T denotes the first continuation number of frames from the current frame to the most past frame, and $S_{i,p}$ denotes an input spectrum at a frame p for an i-th frequency value.

Also, a second noise spectrum stored in the noise spectrum storing unit 77 as a second-place candidate for each frequency value is defined as an input spectrum having a second minimum value among values of input spectra in a current frame and one or more past frames the number of which equals to a second continuation number.

Because conditions of the noise steadily existing in the analog input speech signals Sin change during a long period, the first or second noise spectrum is changed when the first or second continuation number becomes larger than the reference continuation number.

In detail, the first continuation number for the first noise spectrum stored as the first-place candidate and the second continuation number for the second noise spectrum stored as the second-place candidate in the storing unit 77 are respectively incremented in the assuming unit 76 each time a Fourier transformation is performed for each frame of digital input signals in the transforming unit 75. Thereafter, in cases where the first continuation number for one of the frequency values is larger than the reference continuation number, the second noise spectrum and the second continuation number as the second-place candidate are set to a first noise spectrum and a first continuation number as the first-place candidate in the assuming unit 76, a third noise spectrum as a third-place candidate is set to a second noise spectrum as the second-place candidate, and a third continuation number as the third-place candidate is set to zero. In this case, a noise spectrum having a value slightly higher than that of the second noise spectrum is used as the third noise spectrum for the third-place candidate. For example, a noise spectrum having a value 1.2 times as higher as that of the second noise spectrum is automatically set to the third noise spectrum as the third-place candidate.

In cases where the second continuation number for one of the frequency values is larger than the reference continuation number, a third noise spectrum for a third-place candidate is set to a second noise spectrum as the second-place candidate, and a third continuation number as the third-place candidate is set to zero.

In contrast, in cases where either the first or second continuation number for any of the frequency values is not larger than the reference continuation number, the first noise spectrum is compared with an input spectrum for the current frame in the noise assuming unit 76 for each frequency value. In cases where a value of the input spectrum is smaller than that of the first noise spectrum, the first noise spectrum and the first continuation number as the first-place candidate are set to a second noise spectrum and a second continuation number as the second-place candidate, the input spectrum is set to a first noise spectrum as the first-place candidate, and a first continuation number as the first-place candidate is set to zero. In cases where a value of the input spectrum is not smaller than that of the first noise spectrum, the second noise spectrum is compared with the input spectrum in the noise assuming unit 76 for each frequency value. In cases where a value of the input spectrum is smaller than that of the second noise spectrum, the input spectrum is set to a second noise spectrum as the second-place candidate, and a second continuation number as the second-place candidate is set to zero.

Thereafter, the first and second noise spectra and the first and second continuation numbers set in the assuming unit 76 are stored in the storing unit 77.

In this embodiment, a noise spectrum $N_{j,t}$ at a frame t for a j-th frequency value is assumed in the assuming unit 77 from four input spectra corresponding to four frequency values adjacent to each other at the same frame t to reduce a memory capacity of a RAM required to store the noise spectra in the storing unit 77. For example, a fast Fourier transformer having 256 points is used, the noise spectra $N_{j,t}$ are formulated as follows.

$$N_{j,t}=\min\{\min(S_{4j,p}, S_{4j+1,p}, S_{4j+2,p}, S_{4j+3,p})\}(p=t \text{ to } t-T)$$

Here, j ranges from 0 to 31, and i of $S_{i,p}$ ranges from 0 to 127.

In this case, because a pseudo-amplitude spectrum called an input spectrum is symmetric in a frequency axis, when noise spectra $N_{i,t}$ are assumed for all frequency values, because spectra and continuation numbers for 128 frequency values are stored in the storing unit 77, a memory capacity of the RAM is summed up to 512 words {128 (frequency values)*2(spectrum and continuation number)*2(first-place and second-place candidates)}. In contrast, when noise spectra $N_{j,t}$ are assumed from four input spectra, a memory capacity of the RAM is reduced to 128 words {32 (frequency values)*2(spectrum and continuation number)*2 (first-place and second-place candidates)}.

In this case, though frequency resolution for noise spectra is lowered, it is ascertained that noise reducing function in the apparatus 71 is not substantially degraded even though the noise spectra $N_{j,t}$ are assumed in the assuming unit 76. Also,. because each of the noise spectra $N_{j,i}$ is not assumed from one input spectrum for one frequency value, when a stationary sound such as a sine wave, a vowel or the like is continued for a long time, there is an effect that one input spectrum is prevented to be erroneously assumed as a noise spectrum.

After the first and second noise spectra are assumed, a sum of the first noise spectra for all frequency values is calculated as a noise power in the assuming unit 76. When the noise power is lower than a reference noise power, it is judged in the assuming unit 76 that any noise does not exist in the current frame and the past frames corresponding to the first noise spectrum, and a stabilizing coefficient stored in the stabilizing coefficient storing unit 78 is compulsorily set to a high value of 3.0. Thereafter, the stabilizing coefficient set to 3.0 is sent to the noise reducing coefficient adjusting unit 79 to inform the adjusting unit 79 that any noise does not exist in the current frame of input signal and the past frames of input speech signals Sin. Therefore, when any noise does not exist, a noise reducing coefficient can be set to a low value in the adjusting unit 79. That is, a spectrum distortion in a speech caused by the noise reduction can be reduced.

Next, the operation performed in the noise reducing unit 80 is described.

After a current frame of digital input signals is transformed into a current input spectrum in the transforming unit 75, the current input spectrum is transferred to the noise assuming unit 76 and the noise reducing unit 80. In the noise assuming unit 76, a plurality of first noise spectra Ni,t at the current frame for all frequency values are assumed and are stored as the first-place candidates in the noise spectrum storing unit 77. Thereafter, the first noise spectra are transferred to the noise reducing unit 80. In the reducing unit 80, the first noise spectra are respectively multiplied by the noise reducing coefficient adjusted in the adjusting unit 79 to produce a multiplied noise spectrum for each frequency value, and the multiplied noise spectrum is subtracted from the current input spectrum to produce a noise-reduced input spectrum for each frequency value. In contrast, in cases where the first noise spectra Nj,t at the current frame for all reduced-numbered frequency values are assumed in the noise assuming unit 76 and are stored as the first-place candidates in the noise spectrum storing unit 77, the first noise spectra Nj,t are respectively multiplied by the noise reducing coefficient to produce a plurality of multiplied noise spectra, and each of the multiplied noise spectra is subtracted from the current input spectrum corresponding to the same frequency value to produce a plurality of noise-reduced input spectra for all reduced-numbered frequency values.

Next, the operation performed in the spectrum compensating unit 81 is described.

A plurality of input spectra obtained in the transforming unit 75 for all frequency values are stored as a plurality of previous input spectra in the previous spectrum storing unit 82 in advance. After a current input spectrum corresponding to a current frame of digital input signals is calculated in the Fourier transforming unit 75 for each of the frequency values, a stabilizing coefficient stored in the storing unit 78 is referred by the spectrum compensating unit 81. When the stabilizing coefficient is higher than 1.4, it is judged by the compensating unit 81 that a noise assumption for a preceding frame performed in the noise assuming unit 76 is unstable and the previous input spectra stored in the storing unit 82 in advance are also unstable. Therefore, the particular previous input spectra stored in the storing unit 82 are replaced with a plurality of current input spectra for a current frame, and the current input spectra stored in the storing unit 82 are called a plurality of previous input spectra for all frequency values. In contrast, in cases where the stabilizing coefficient is not higher than 1.4, the previous input spectra stored in the storing unit 82 is maintained.

Thereafter, when a plurality of current noise-reduced input spectra corresponding to the current frame of digital input signals for all frequency values are transmitted from the noise reducing unit 80 to the compensating unit 81, values of the current noise-reduced input spectra are examined. In cases where a value of a particular current noise-reduced input spectrum for a particular frequency value is negative, one input spectrum having a lower value between a current input spectrum for the particular frequency value transmitted from the transforming unit 75 and a previous input spectrum for the particular frequency value stored in the storing unit 82 is selected as an output spectrum for the particular frequency value. In contrast, in cases where the value of the particular current noise-reduced input spectrum for the particular frequency value is not negative, a particular current noise-reduced input spectrum for the particular frequency value is adopted as an output spectrum for the particular frequency value. Thereafter, each of the output spectra for all frequency values is stored in the storing unit 82 to replace the previous input spectrum stored in the unit 82 with the output spectra. The output spectra stored in the unit 82 are called a plurality of previous input spectra. Also, the output spectra are transmitted to the inverse Fourier transforming unit 83.

In this embodiment, the previous spectrum storing unit 82 is required to store the previous input spectra. However, in cases where multiplied input spectra obtained by multiplying the current input spectra by a coefficient are treated as the previous input spectra, the storing unit 82 is not required, and a memory capacity required in the apparatus 71 can be reduced. Also, in cases where a particular current input spectrum for a particular frequency value is set as a particular output spectrum for the particular frequency value when a particular current noise-reduced input spectrum for the particular frequency value is negative, the storing unit 82 is not required.

Also, in cases where any speech is not included in a current frame and only a noise is included in the current frame, a sound power at the current frame is suddenly reduced when the noise is reduced in the noise reducing unit 80, and allophone occurs in the current frame because of the sudden change of the sound power. To prevent the occurrence of the allophone, sound power at a series of frames including the current frame is smoothed by using a sound power of the previous input spectra stored in the storing unit 82. In detail, a sum of values of the output spectra corresponding to a current frame is calculated as an output sound power. Thereafter, the stabilizing coefficient stored in the storing unit 78 is referred. In cases where the stabilizing coefficient is higher than 1.4, the output sound power calculated is stored in the storing unit 82 as a previous sound power. In contrast, in cases where the stabilizing coefficient is not higher than 1.4, a sound power obtained by adding values of the previous input spectra stored in the unit 82 together is stored in the storing unit 82 as a previous sound power.

Thereafter, in cases where the output sound power is less than 1.8 times the previous sound power stored in the storing unit 82 and in cases where the previous sound power is less than a multiplied sound power obtained by multiplying the noise power calculated in the assuming unit 76 by a value equal to 1.4 times the noise reducing coefficient, the smoothing for the output sound power is performed by changing the previous sound power Dp stored in the storing unit 82 to a new previous sound power Dq as follows.

$$Dq=Dp*0.8+Ap*0.2$$

Here, Ap denotes the output sound power.

Thereafter, each of the output spectra for all frequency values at the current frame is multiplied by a divided value Dq/Dp, and a plurality of multiplied output spectra for all frequency values at the current frame are obtained. Thereafter, the new previous sound power Dq is replaced with the previous sound power Dp stored in the storing unit 82, and the multiplied output spectra are replaced with the previous input spectra stored in the storing unit 82. Also, the multiplied output spectra are treated as a plurality of output spectra and are processed in the inverse Fourier transforming unit 83.

In the inverse Fourier transforming unit 83, a plurality of complex spectra are produced from the phase spectra obtained in the Fourier transforming unit 75 and the output spectra obtained in the spectrum compensating unit 81, and an inverse fast Fourier transformation is performed for the complex spectra to obtain a group of first-order output signals.

Next, the operation performed in the spectrum emphasizing unit 84 for the group of first-order output signals is described.

An operation in a very emphasizing filter is performed for the group of first-order output signals obtained in the transforming unit 83 with the MA coefficients $\alpha(MA)_i$ and the AR coefficients $\alpha(AR)_i$ obtained in the analyzing unit 74. A transfer function Ft1 of the very emphasizing filter is expressed as follows.

$$Ft1=\{1+((MA)_i{}^*Z^{-1}+\alpha(MA)_2{}^*Z^{-2}+\cdots+\alpha(MA)_j{}^*Z^{-j}\}/\{1+\alpha(AR)_i{}^*Z^{-1}+\alpha(AR)_2{}^*Z^{-2}+\cdots+\alpha(AR)_j{}^*Z^{-j}\}$$

To moreover emphasize high frequency components of the group of first-order output signals, an operation in a high frequency emphasizing filter is performed for the group of first-order output signals with a high frequency component emphasizing coefficient 8 predetermined. A transfer function Ft2 of the high frequency emphasizing filter is expressed as follows.

$$Ft2=1-\delta Z^{-1}$$

To moreover emphasize a sound power of the group of first-order output signals, the group of first-order output signals in which the high frequency components are emphasized by the very emphasizing filter is multiplied by a power emphasizing coefficient predetermined to produce a group of second-order output signals.

In the waveform matching unit 86, the group of second-order output signals obtained in the emphasizing unit 84 and a head portion of a current frame of output signals stored in the pre-read waveform storing unit 85 are superposed each other. In this case, the group of second-order output signals is composed of a current frame of second-order output signals and a head portion of a succeeding frame of second-order output signals simultaneously emphasized with the current frame of second-order output signals, and the head portion of the current frame of output signals stored in the pre-read waveform storing unit 85 is generated from a head portion of a current frame of second-order output signals simultaneously emphasized with a preceding frame of second-order output signals previously. Therefore, when the group of second-order output signals and the head portion of the current frame of output signals are superposed each other, the group of second-order output signals is transformed into a current frame of final-order output signals and a head portion of a succeeding frame of final-order output signals, and the current frame of final-order output signals matches with a preceding frame of final-order output signals previously transformed. Thereafter, the current frame of final-order output signals is output as a current frame of output signals, and the head portion of the succeeding frame of second-order output signals is output as a head portion of a succeeding frame of output signals. Also, the head portion of the current frame of output signals stored in the storing unit 85 is replaced with the head portion of the succeeding frame of final-order output signals. The head portion of the succeeding frame of final-order output signals stored in the unit 85 is called a head portion of the succeeding frame of output signals.

The matching operation is performed according to following equations.

$$Oj=(j^*Dj+(L-j)^*Z_j)/L \;(j=0 \text{ to } L-1)$$

$$Oj=Dj \;(j=L \text{ to } L+M-1)$$

Here, Oj denotes the output signals in the current frame and the head portion of the succeeding frame, $D_j$ denotes the second-order output signals in the current frame and the head portion of the succeeding frame, $Z_j$ denotes the head portion of the current frame of output signals stored in the pre-read waveform storing unit 85, L denotes the number of signals existing in the head portion of the current (or succeeding) frame, and M denotes the number of signals existing in the current frame. Also, the head portion of the current frame of output signals $Z_j$ stored in the pre-read waveform storing unit 85 is replaced with the head portion of the succeeding frame of output signals $O_{M+j}$ simultaneously transformed with the current frame of output signals in the matching unit 86 as follows.

$$Zj=O_{M+j} \;(j=0 \text{ to } L-1)$$

In this case, through the output signals Oj (j=0 to L+M−1) in the current frame and the head portion of the succeeding frame are output, the output signals $O_j$ (j=0 to M−1) in the current frame are used for a following apparatus (not shown).

In contrast, the output signals $O_j$ (j=M to L+M−1) in the head portion of the succeeding frame are abandoned because other output signals $O_j$ (j=0 to M−1) in the succeeding frame are output in a following step. However, because the continuity of the output signals $O_j$ (j=M to L+M−1) in the head portion of the succeeding frame and the output signals $O_j$ (j=0 to M−1) in the current frame is maintained, the output signals $O_j$ (j=M to L+M−1) can be used for a frequency analysis such as a linear prediction analysis or a filter analysis.

Next, an estimation of the performance of the noise reducing apparatus 71 is described.

Figure 1:
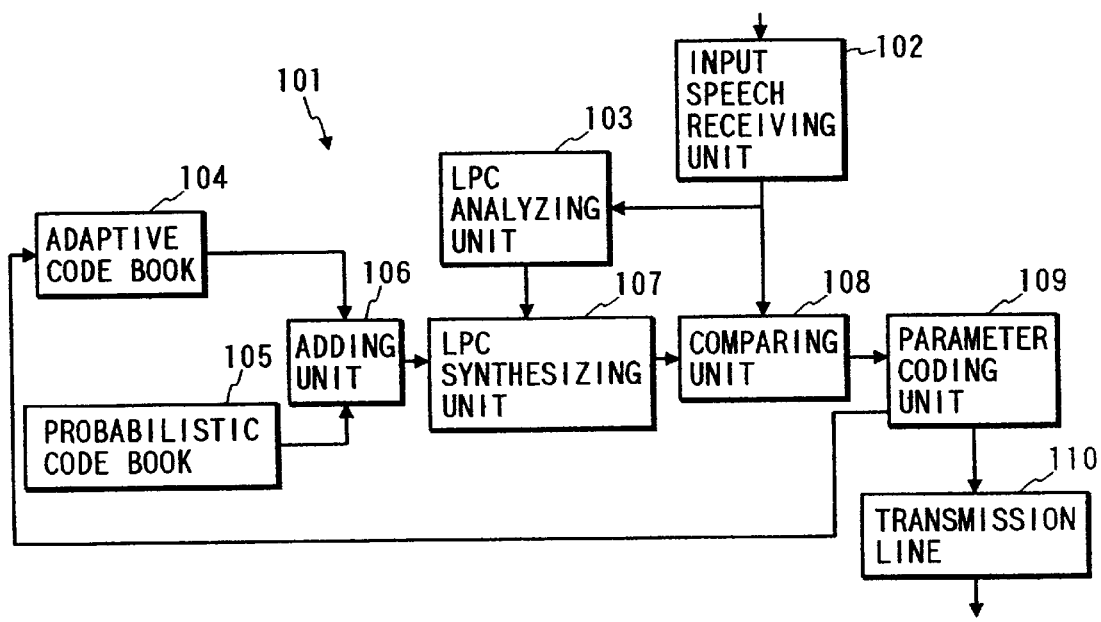
FIG. 1 is a functional block diagram of a conventional speech coding apparatus according to a CELP coding method.
Figure 2:
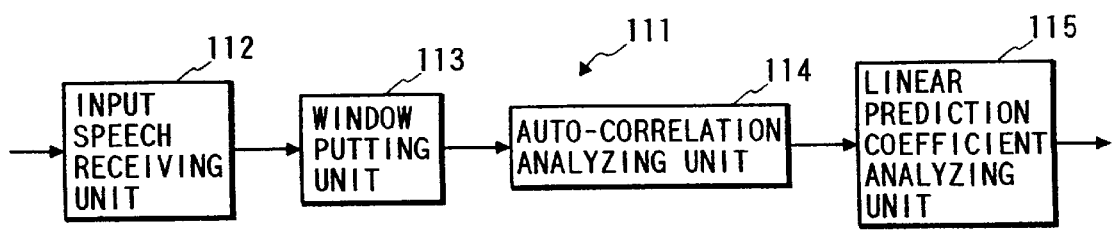
FIG. 2 is a block diagram of a conventional linear prediction coefficient analyzing apparatus used for a speech coding apparatus.
Figure 3:
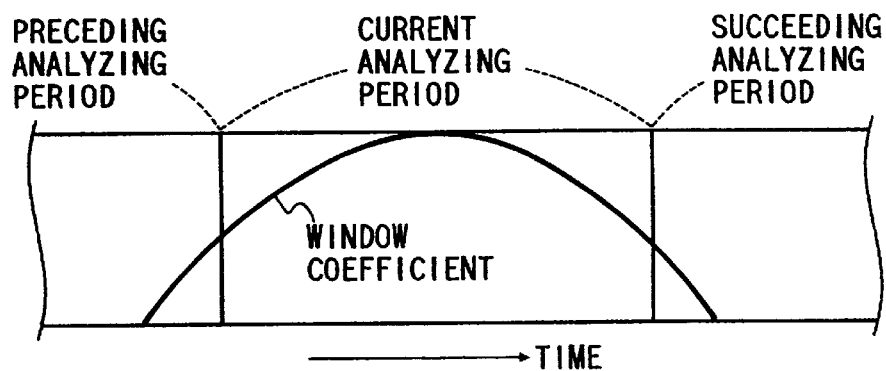
FIG. 3 shows a window coefficient by which a portion of a preceding speech signal at a preceding analyzing period, an entire current speech signal at a current analyzing period and a portion of a succeeding speech signal at a succeeding analyzing period are multiplied in the conventional linear prediction coefficient analyzing apparatus shown in FIG. 3.
Figure 4:
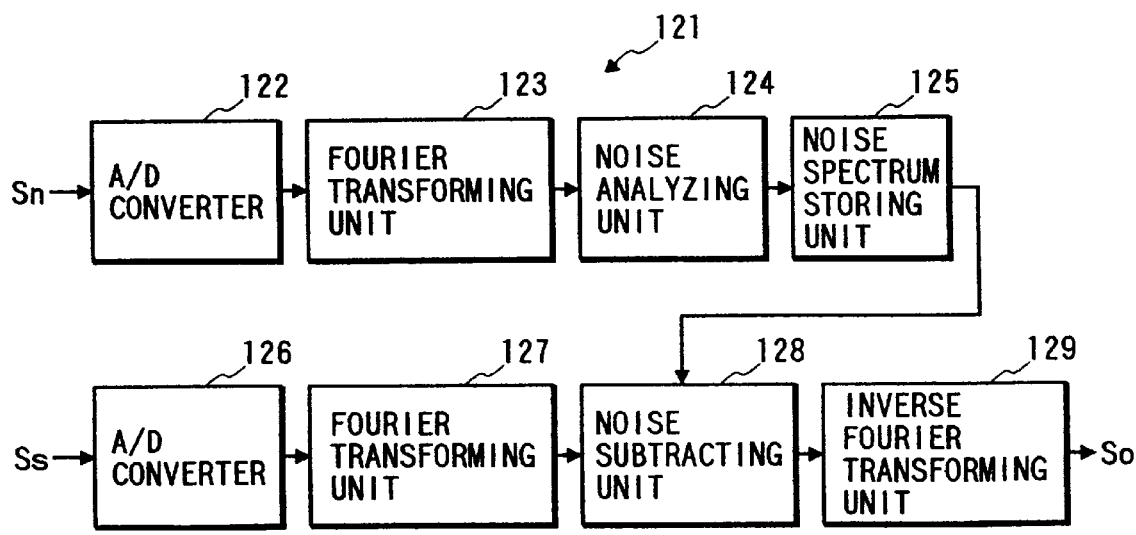
FIG. 4 is a block diagram of a conventional noise reduction apparatus in which a spectrum subtraction method is applied for reduction of a noise included in a speech signal.

To estimate the performance of the noise reducing apparatus 71, a plurality of speech signals Sin including a speech and a noise are input to the noise reducing apparatus 71 to reduce the noise. Thereafter, a plurality of output signals So obtained in the apparatus 71 are input to a speech coding apparatus in which the CELP coding method is performed, and a plurality of coded signals are obtained. Thereafter, the coded signals are decoded to reproduce the speech. As is described in the prior art shown in FIG. 4, the drawback in the conventional speech coding apparatus or a conventional speech codec is that noise existing in a speech is reproduced as an allophone when the noise is coded and decoded, and it is difficult to recognize a synthesis speech. Therefore, a large number of men and women listen to a synthesis speech, and a subjective estimation is performed.

Figure 18:
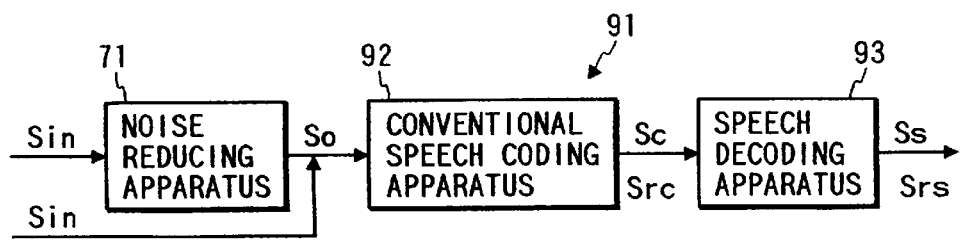
FIG. 18 is a block diagram of a noise reducing system in which the noise reducing apparatus shown in FIG. 17 is arranged.

A noise-reduced synthesis speech is produced in a noise reducing system 91 shown in FIG. 18.

A plurality of speech signals Sin including a noise are input to the noise reducing apparatus 71, and the noise is reduced. Thereafter, a plurality of output signals So obtained in the apparatus 71 are input to a conventional speech coding apparatus 92 to generate a plurality of coded speech signals Sc. Thereafter, the coded speech signals Sc are decoded in a speech decoding apparatus 93 to reproduce the speech as a noise-reduced synthesis speech Ss. Also, to produce a referential synthesis speech in which the noise is not reduced, the speech signals Sin are directly input to the conventional speech coding apparatus 92, and a plurality of referential coded speech signals Src are obtained. Thereafter, the referential coded speech signals Src are input to the speech decoding apparatus 93, and a referential synthesis speech Srs is obtained.

A memory capacity of a static RAM in the apparatus 71 is about 300 words, a memory capacity of a dynamic RAM in the apparatus 71 is about 1.4 kwords, and a processing volume in the apparatus 71 is about 3 MOPS. A Japanese short sentence is read by two men and two women for two or three seconds to produce a plurality of noiseless speech signals. Also, the speech signals including noise are produced by adding a road noise to the noiseless speech signals at an S/N ratio of 20 dB. A noiseless synthesis speech is obtained by inputting the noiseless speech signals to the system 91.

The noiseless synthesis speech, the referential synthesis speech in which noise is not reduced and the noise-reduced synthesis speech are estimated by listeners composed of sixteen men and women. Each of the listeners gives one of five types estimating values for each of the noiseless synthesis speech, the referential synthesis speech and the noise-reduced synthesis speech. In cases where a listener feels that a synthesis speech is very bad, the listener gives an estimating value of 1. In cases where a listener feels that a synthesis speech is bad, the listener gives an estimating value of 2. In cases where a listener feels that a synthesis speech is moderate, the listener gives an estimating value of 3. In cases where a listener feels that a synthesis speech is good, the listener gives an estimating value of 4. In cases where a listener feels that a synthesis speech is very good, the listener gives an estimating value of 5. Thereafter, a mean opinion score is calculated by averaging the estimating values given by the listeners for each synthesis speech. The mean opinion scores are shown in Table 2.

TABLE 2

| Noiseless synthesis speech | Referential synthesis speech | Noise-reduced synthesis speech |
|---|---|---|
| 3.50 | 3.13 | 3.50 |

As shown in Table 2, the mean opinion score for the noiseless synthesis speech is very high. However, as a noise included in a synthesis speech is increased, a feeling for the synthesis speech becomes worse because of allophone caused by the noise. Therefore, in cases where the noise included in the speech signals is not reduced in the noise reducing apparatus 71, the mean opinion score is considerably reduced to 3.13. That is, a reproduced quality for the speech is considerably degraded. In contrast, in cases where the noise included in the speech signals is reduced in the noise reducing apparatus 71, the mean opinion score is not reduced. That is, a reproduced quality for the speech is not degraded.

Accordingly, because an input spectrum having a minimum value among values of input spectra at a current frame and one or more past frames is defined as a noise spectrum at the current frame for each frequency value and the noise spectrum is assumed according to the above definition in the assuming unit 76, regardless of whether a noise is included in the current frame of speech signals, a noise spectrum can be reliably assumed in the assuming unit 76. That is, even though it is difficult to specify a frame of input speech signals in which a speech exists, a noise existing with the speech or existing with a non-speech signal can be reliably detected, and the noise can be reduced at a moderate degree in the noise reducing unit 80 by using the stabilizing coefficient and the noise reducing coefficient.

Also, features of an input spectrum envelope can be emphasized in the emphasizing unit 84 by using the linear prediction coefficient. Therefore, even though a noise intensity is high, the degradation of a reproduced speech quality can be prevented.

Also, because the calculation required to obtain amplitude spectra is not performed and the pseudo-amplitude spectra are calculated in the Fourier transforming unit 75, the calculation for obtaining a square root of a squared absolute value can be omitted, and a calculation volume required to obtain the input spectra can be considerably reduced in the Fourier transforming unit 75.

Also, because a noise spectrum for a j-th frequency value is assumed from four input spectra for j-th, (j+1)-th, (j+2)-th and (j+3)-th frequency values in the assuming unit 77, the noise spectrum for four frequency values can be obtained. Therefore, a memory capacity of a RAM required to store the noise spectra in the noise spectrum storing unit 77 can be reduced. Also, because each of the noise spectra is not assumed from one input spectrum for one frequency value, it can be prevented that a stationary sound continuing for a long time is erroneously assumed as a noise.

Also, because a first noise spectrum stored in the storing unit 77 as a first-place candidate is abandoned when a storing period of the first noise spectrum is in excess of a reference continuation period and a second noise spectrum stored in the storing unit 77 as a second-place candidate is set as the first-place candidate, even though a noise gradually changes, the noise assumption adapted for the change of the noise can be performed.

Also, because the stabilizing coefficient C is set to a low value when a noise stably exists in the input speech signals Sin, the noise reducing coefficient Q is set to a high value. Therefore, even though an intensity of noise assumed in the noise assuming unit 76 is lower than an actual noise intensity, the noise intensity assumed can be heightened by multiplying the noise spectrum by the noise reducing coefficient. Therefore, the noise existing in the input speech signals Sin can be reduced at a moderate degree in the noise reducing unit 80.

Also, because the stabilizing coefficient C is set to a high value when any noise does not exists in the input speech signals Sin, the noise reducing coefficient Q is set to zero. Therefore, because a value of the noise spectrum is not reduced in the noise reducing unit 80, a spectrum distortion in a speech signal caused by a noise reduction can be prevented.

Also, in cases where a value of a noise-reduced input spectrum at a current frame for a particular frequency value is negative, the noise-reduced input spectrum is replaced with an input spectrum having a lower value between a current input spectrum and a preceding input spectrum for the particular frequency value, and the noise-reduced input spectrum is compensated for an excess reduction of noise in the spectrum compensating unit 81. Therefore, an allophone feeling for the particular frequency value can be reduced, and the degradation of a reproduced speech quality can be prevented.

Also, because the first-order output signals obtained in the inverse Fourier transforming unit 83 are emphasized in a very emphasizing filter, a high frequency emphasizing filter and a power emphasizing filter, a spectrum distortion caused by the noise reduction can be corrected, a reproduced sound quality can be improved. Also, even though a degree of noise reduction is high because the noise intensity is high, the degradation of the reproduced sound quality can be prevented.

Also, because each frame of output signals is matched to adjacent frames of output signals in the waveform matching unit 86, a reproduced sound quality can be improved.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A noise reducing apparatus, comprising:

speech signal receiving means for receiving a plurality of frames of analog speech signals in which a noise exists and converting the frames of analog speech signals into a plurality of frames of digital speech signals one after another;

Fourier transforming means for performing a discrete Fourier transformation for each of the frames of digital speech signals obtained by the speech signal receiving means and producing an input spectrum and a phase spectrum corresponding to each of the frames of digital speech signals for each of frequency values;

noise assuming means for selecting a particular input spectrum having a minimum value from among a current input spectrum, produced by the Fourier transforming means, corresponding to a current frame of digital speech signals and a predetermined number of past input spectra, produced by the Fourier transforming means, corresponding to past frames of digital speech signals preceding to the current frame and assuming the particular input spectrum as a noise spectrum corresponding to the current frame of digital speech signals for each of the frequency values;

noise reducing degree determining means for determining a degree of a noise reduction according to each of the frames of digital speech signals obtained by the speech signal receiving means;

noise reducing means for adjusting a value of each of the noise spectra assumed by the noise assuming means according to the degree of the noise reduction determined by the noise reducing degree determining means to produce an adjusted noise spectrum having an adjusted value corresponding to the current frame of digital speech signals for each of the frequency values, subtracting the adjusted noise spectrum from the current input spectrum produced by the Fourier transforming means for each of the frequency values to reduce the noise existing in the current frame of digital speech signals, and producing a noise-reduced input spectrum corresponding to the current input spectrum for each of the frequency values; and inverse Fourier transforming means for performing an inverse Fourier transformation for the noise-reduced input spectra produced by the noise reducing means according to the phase spectra, produced by the Fourier transforming means, corresponding to the current frame of digital speech signals, producing a current frame of first-order output signals corresponding to the current frame of digital speech signals, and outputting a plurality of frames of first-order output signals corresponding to the frames of analog speech signals received by the speech signal receiving means, one after another as a plurality of frames of output signals.

2. A noise reducing apparatus according to claim 1, further comprises:

linear prediction coefficient analyzing means for performing a linear prediction analysis for each of the frames of digital speech signals obtained by the speech signal receiving means and producing a linear prediction coefficient for each of the frames of digital speech signals; and spectrum emphasizing means for emphasizing a spectrum of each frame of the output signals output from the inverse Fourier transforming means, the frames of output signals emphasized being output.

3. A noise reducing apparatus according to claim 2 in which the emphasis of the spectrum of each of the output signals is performed by using a very emphasizing filter, a high frequency emphasizing filter and a power emphasizing filter according to the linear prediction coefficient produced by the linear prediction coefficient analyzing means.

4. A noise reducing apparatus according to claim 1, further comprises:

spectrum compensating means for looking for a particular noise-reduced input spectrum, produced by the noise reducing means, having a value lower than a predetermined value and compensating the particular noise-reduced input spectrum for an excessive subtraction of the adjusted noise spectrum, the particular noise-reduced input spectrum compensated being inversely transformed by the inverse Fourier transforming means.

5. A noise reducing apparatus according to claim 2, further comprises:

waveform matching means for matching a waveform of a current frame of output signals output from the inverse Fourier transforming means to a waveform of a preceding frame of output signals, output from the inverse Fourier transforming means, preceding the current frame, a plurality of frames of output signals matched being output one after another.

6. A noise reducing apparatus according to claim 2 in which each of the input spectra produced by the Fourier transforming means is a pseudo-amplitude spectrum obtained by adding an absolute value of a real component of a complex spectrum obtained according to the discrete Fourier transformation and an absolute value of an imaginary component of the complex spectrum.

7. A noise reducing apparatus according to claim 2, further comprising:

noise spectrum storing means for storing one noise spectrum having a smallest value among a plurality of noise spectra, assumed by the noise assuming means, corresponding to a particular frame and a plurality of particular frequency values as a representative noise spectrum corresponding to the particular frame and the particular frequency values, a value of the representative noise spectrum stored in the noise spectrum storing means being adjusted by the noise reducing means to produce an adjusted noise spectrum having an adjusted value.

8. A noise reducing apparatus according to claim 2, further comprising:

noise spectrum storing means for storing a first noise spectrum, assumed by the noise assuming means, corresponding to the current and a first predetermined number of first past frames of digital speech signals as a first-place candidate for a particular frequency value, a first continuation number equal to the number of the first past frames, a second noise spectrum, assumed by the noise assuming means, corresponding to the current and a second predetermined number of second past frames of digital speech signals as a second-place candidate for the particular frequency value, and a second continuation number equal to the number of the second past frames, the first noise spectrum being adjusted by the noise reducing means to produce an adjusted noise spectrum having an adjusted value in cases where the first continuation number is equal to or smaller than a referential continuation number, and the first noise spectrum being abandoned to set the second noise spectrum as the first-place candidate and the second noise spectrum set as the first-place candidate being adjusted by the noise reducing means to produce an adjusted noise spectrum having an adjusted value in cases where the first continuation number is larger than the referential continuation number.

9. A noise reducing apparatus according to claim 1 in which the noise reducing degree determining means comprises:

stabilizing coefficient storing means for storing a stabilizing coefficient indicating the stability of the noise spectra assumed by the noise assuming means for each of the digital speech signals; and noise reducing coefficient adjusting means for adjusting a noise reducing coefficient as the degree of the noise reduction according to the stabilizing coefficient stored in the stabilizing coefficient storing means and reducing the stabilizing coefficient to indicate a higher stability of the noise spectra assumed by the noise assuming means each time a frame of digital speech signals is obtained by the speech signal receiving means.

10. A noise reducing apparatus according to claim 9 in which a value of each of the noise spectra assumed by the noise assuming means is multiplied by the noise reducing coefficient adjusted by the noise reducing coefficient adjusting means in the noise reducing means to produce an adjusted noise spectrum having an adjusted value.

11. A noise reducing apparatus according to claim 9 in which a noise power is calculated by the noise assuming means by adding the noise spectra assumed by the noise assuming means together, the stabilizing coefficient stored in the stabilizing coefficient storing means is compulsorily set to a high value in cases where the noise power is lower than a referential noise power, and the adjusted value of each of the adjusted noise spectra produced according to the degree of the noise reduction which is adjusted according to the stabilizing coefficient having the high value is equal to the value of each of the noise spectra.

12. A noise reducing apparatus according to claim 9, further comprising:

previous spectrum storing means for storing a plurality of previous input spectra for all frequency values and storing a plurality of current input spectra at a current frame produced by the Fourier transforming means in place of the previous input spectra as other previous input spectra in cases where the stabilizing coefficient stored in the stabilizing coefficient storing means indicates that a current noise spectrum at the current frame assumed by the noise assuming means is unstable; and spectrum compensating means for selecting a particular input spectrum having a lower value between a current input spectrum for a particular frequency value produced by the Fourier transforming means and a particular previous input spectrum for the particular frequency value stored in the previous spectrum storing means in cases where a particular current noise-reduced input spectrum for the particular frequency value has a negative value and outputting the particular input spectrum as the particular current noise-reduced input spectrum compensated to the inverse Fourier transforming means, the particular input spectrum being replaced with the particular previous input spectrum stored in the previous spectrum storing means.

13. A noise reducing apparatus according to claim 9, further comprising:

previous spectrum storing means for storing a plurality of previous input spectra for all frequency values, storing a plurality of current input spectra at a current frame produced by the Fourier transforming means in place of the previous input spectra as other previous input spectra in cases where the stabilizing coefficient stored in the stabilizing coefficient storing means is higher than a particular value to indicate that a current noise spectrum at the current frame assumed by the noise assuming means is unstable, and storing a previous sound power obtained by adding values of the previous input spectra; and spectrum compensating means for selecting a particular input spectrum having a lower value between a current input spectrum for a particular frequency value produced by the Fourier transforming means and a particular previous input spectrum for the particular frequency value stored in the previous spectrum storing means in cases where a particular current noise-reduced input spectrum for the particular frequency value has a negative value, regarding the particular input spectrum as an output spectrum for the particular frequency value, regarding the particular current noise-reduced input spectrum as an output spectrum for the particular frequency value in cases where the particular current noise-reduced input spectrum has a zero value or a positive value, adding a plurality of output spectra for all frequency values together to obtain an output sound power, replacing the previous input spectrum stored in the previous spectrum storing means with the output spectra, replacing the previous sound power stored in the previous spectrum storing means with the output power as another previous sound power in cases where the stabilizing coefficient stored in the stabilizing coefficient storing means is higher than the particular value, calculating a new previous sound power from the previous sound power stored in the previous spectrum storing means and the output power in cases where the output power is lower than a multiplied previous sound power obtained by multiplying the previous sound power by a first factor and the previous sound power is lower than a multiplied noise power obtained by multiplying a noise power equal to a sum of values of the noise spectra for all frequency values assumed by the noise assuming means by a second factor, calculating a power ratio by dividing the new previous sound power by the output power, producing a plurality of new output spectra by multiplying the output spectra by the power ratio, replacing the previous sound power stored in the previous spectrum storing unit with the new previous sound power, and outputting the new output spectra to the inverse Fourier transforming unit as the noise-reduced input spectra for all frequency values.

14. A noise reducing apparatus according to claim 1, further comprising:

previous spectrum storing means for storing a plurality of previous input spectra for all frequency values;

spectrum compensating means for selecting a particular input spectrum having a lower value between a current input spectrum for a particular frequency value produced by the Fourier transforming means and a particular previous input spectrum for the particular frequency value stored in the previous spectrum storing means in cases where a particular current noise-reduced input spectrum for the particular frequency value has a negative value and outputting the particular input spectrum as the particular current noise-reduced input spectrum compensated to the inverse Fourier transforming means, the particular input spectrum being replaced with the particular previous input spectrum stored in the previous spectrum storing means.

15. A noise reducing apparatus according to claim 1, further comprises:

pre-read waveform storing means for storing a head portion of a current frame of output signals output from the inverse Fourier transforming means; and waveform matching means for receiving the current frame of output signals and a head portion of a succeeding frame of output signals output from the inverse Fourier transforming means, deforming a waveform of the current frame received according to the head portion of the current frame stored in the pre-read waveform storing means to match the waveform of the current frame to a waveform of a preceding frame of output signals, transmitting the head portion of the succeeding frame of output signals to the pre-read waveform storing means to replace the head portion of the current frame stored in the pre-read waveform storing means with the head portion of the succeeding frame of output signals, and outputting the matched current frame of output signals.

* * * * *

UNITED STATES PATENT AND TRADEMARK OFFICE
CERTIFICATE OF CORRECTION

PATENT NO. : 6,205,421 B1
DATED : March 20, 2001
INVENTOR(S) : Morii

It is certified that error appears in the above-identified patent and that said Letters Patent is hereby corrected as shown below:

Foreign Application Priority Data

Third Japanese Application No. should read "6-322494" not "6-332494".

Signed and Sealed this

Eighteenth Day of September, 2001

*Attest:*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,205,421 B1
DATED : March 20, 2001
INVENTOR(S) : Morii

It is certified that error appears in the above-identified patent and that said Letters Patent is hereby corrected as shown below:

Foreign Application Priority Data
First Japanese Application No. should read "6-314483" not "6-314463".

Signed and Sealed this

Sixth Day of November, 2001

Attest:

*Nicholas P. Godici*

NICHOLAS P. GODICI
*Attesting Officer    Acting Director of the United States Patent and Trademark Office*